(12) United States Patent
Voroninski et al.

(10) Patent No.: US 12,205,197 B1
(45) Date of Patent: Jan. 21, 2025

(54) LABEL IMAGE SYNTHESIS USING GENERATIVE AI

(71) Applicant: Helm.ai, Inc., Menlo Park, CA (US)

(72) Inventors: Vladislav Voroninski, Redwood City, CA (US); Michael W. Daub, Woodinville, WA (US); Aria Corinne Mondragon, Chicago, IL (US); Ryan Xu, Reading, MA (US); Tonci Antunovic, Split (HR)

(73) Assignee: Helm.ai, Inc., Menlo Park, CA (US)

( * ) Notice: Subject to any disclaimer, the term of this patent is extended or adjusted under 35 U.S.C. 154(b) by 0 days.

(21) Appl. No.: 18/429,253

(22) Filed: Jan. 31, 2024

Related U.S. Application Data

(60) Provisional application No. 63/442,713, filed on Feb. 1, 2023.

(51) Int. Cl.
*G06T 11/60* (2006.01)
*G06F 40/40* (2020.01)
*G06T 7/10* (2017.01)
*G06T 11/00* (2006.01)
*G06V 20/70* (2022.01)

(52) U.S. Cl.
CPC ............ *G06T 11/001* (2013.01); *G06F 40/40* (2020.01); *G06T 7/10* (2017.01); *G06T 11/60* (2013.01); *G06V 20/70* (2022.01); *G06T 2207/10024* (2013.01); *G06T 2207/20081* (2013.01); *G06T 2207/20084* (2013.01)

(58) Field of Classification Search
CPC ......... G06T 11/001; G06T 11/60; G06T 7/10; G06F 40/40; G06V 40/70

USPC ......................................................... 345/589
See application file for complete search history.

(56) References Cited

PUBLICATIONS

"Generative Adversarial Networks with Bi-directional Normalization for Semantic Image Synthesis", Jia Long et al., Aug. 21-24, 2021, Taipei, Taiwan. ACM, New York, NY, USA, 8 pages.*

"R-GAN: Exploring Human-like Way for Reasonable Text-to-Image Synthesis via Generative Adversarial Networks", Yanyuan Qiao et al., Oct. 20-24, 2021.*

"Palette: Image-to-Image Diffusion Models", Chitwan Saharia et al., SIGGRAPH '22 Conference Proceedings, Aug. 7-11, 2022, Vancouver, BC, Canada.*

Bi-Directional Normalization and Color Attention-Guided Generative Adversarial Network for Image Enhancement, Shan Liu et al., 2022 IEEE.*

Burgert et al. Peekaboo: Text to Image Diffusion Models are Zero-Shot Segmentors. arXiv:2211.13224v1 [cs.CV] Nov. 23, 2022.

* cited by examiner

*Primary Examiner* — Javid A Amini
(74) *Attorney, Agent, or Firm* — Van Pelt, Yi & James LLP

(57) ABSTRACT

Generative image synthesis conditioned on label prompts includes receiving a label prompt comprising a mapping of labels to portions of an image to be synthesized. At least some of the labels in the label prompt correspond to an object to be included in the image to be synthesized. It further includes, based on the label prompt, generating, using a generative model, a synthesized image corresponding to the label prompt.

18 Claims, 19 Drawing Sheets

LABEL IMAGE SYNTHESIS USING GENERATIVE AI

CROSS REFERENCE TO OTHER APPLICATIONS

This application claims priority to U.S. Provisional Patent Application No. 63/442,713 entitled LABEL IMAGE SYNTHESIS USING GENERATIVE AI filed Feb. 1, 2023 which is incorporated herein by reference for all purposes.

BACKGROUND OF THE INVENTION

Training models for real-world perception tasks can be challenging. For example, collecting sufficient training data for training such models can be difficult. Improved techniques for obtaining training samples for training perception models is needed.

BRIEF DESCRIPTION OF THE DRAWINGS

Various embodiments of the invention are disclosed in the following detailed description and the accompanying drawings.

DETAILED DESCRIPTION

Figure 1:
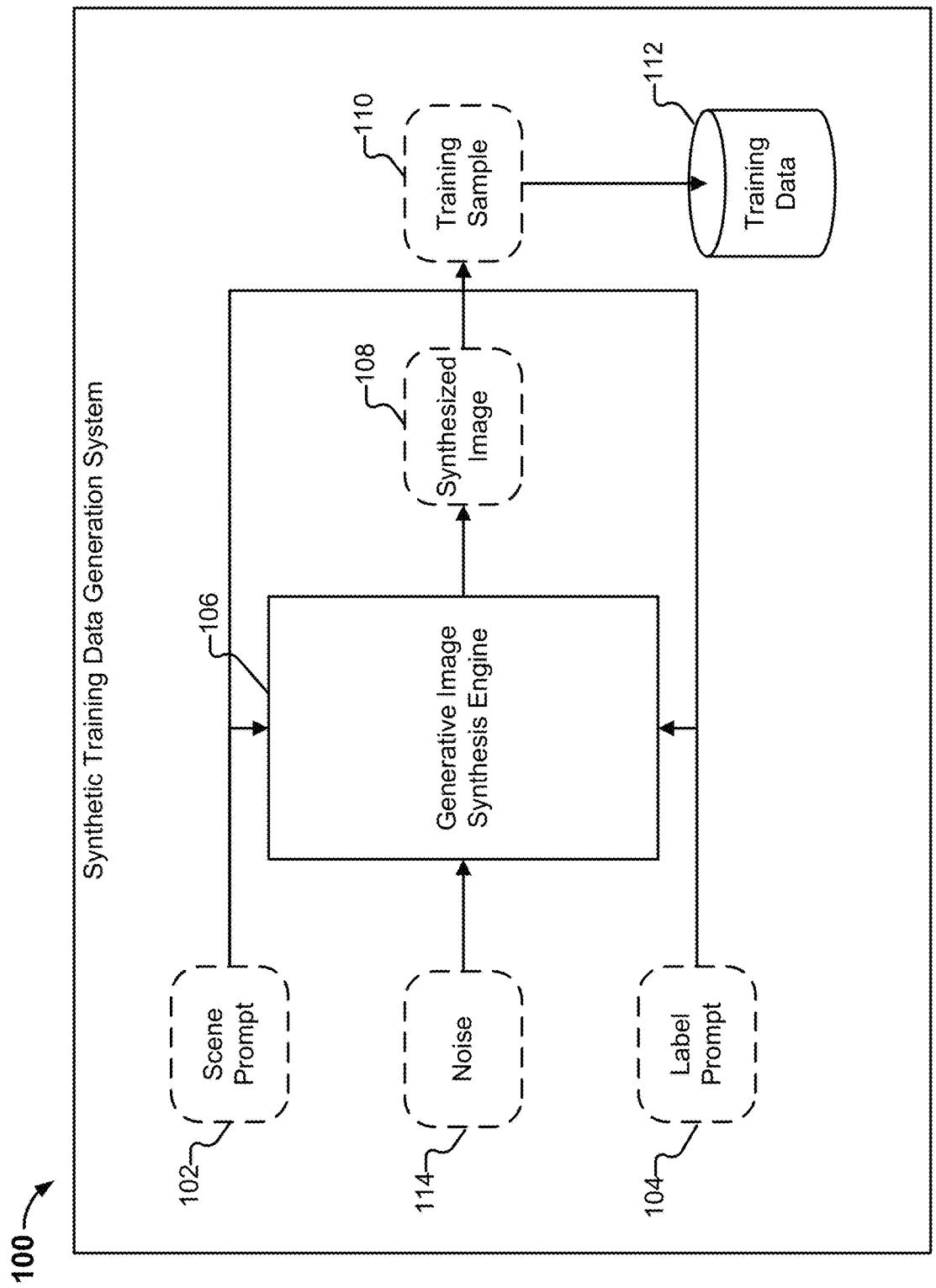
FIG. 1 illustrates an embodiment of a system for generative image synthesis.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Training AI (artificial intelligence) models for real-world perception tasks can be challenging. For example, in the context of autonomous driving, numerous scenarios and situations may arise while on the road, some of which may be rare, but nevertheless of importance to detect and understand, such as due to improving safety. However, training such AI perception models that are robust to various failure modes, rare conditions, and various types of difficult scenarios can be challenging, as it may be infeasible to not only label all of the data that is collected for all of the scenarios that may be encountered, but also to obtain sufficient footage for all of the scenarios that are encountered, some of which can be rare. For example, suppose that there is a type of road marker that is important to be able to detect, but is also very rare on roads. It may be the case that there is a limited amount of footage of this road marker, where the footage of the road marker is further limited by being constrained to a particular scenario, such as being during the daytime on a cloudless day. It would be beneficial if there were footage of such a rare road marker object, but for other scenarios or scenes as well, such as at night-time, in the snow, during rain, etc. While there may be separate individual footage for the rare road marker object, as well as separate footage of different weather scenes or conditions, obtaining or collecting real-world footage for such various combinations of objects and scenes can be challenging.

The following are embodiments of synthesizing or generating images with various combinations of objects and scenes, without having actually collected them using an imaging sensor such as a camera. The synthetic images can then be used in training samples to train AI perception models. Further, embodiments of the techniques for synthesizing or generating training images described herein facilitate the generation of training images that have a corresponding or matching set of correct labels, where the synthetic images are used in conjunction with appropriate labels for training AI perception models to, for example, learn to detect various types of objects under various types of scenes or conditions.

Further details and embodiments regarding generating training samples by synthesizing images corresponding to matching labels are described below. As will be described in further detail below, in some embodiments, the synthetic images are generated using diffusion models to generate images conditioned on prompts such as text scene prompts, as well as label prompts (e.g., segmentation masks or 3D (three-dimensional) bounding boxes for objects in the image to be synthesized). For example, as will be described in further detail below, embodiments of the generative image synthesis models described herein are trained to generate synthetic images that have scenes or conditions matching to the scenes or conditions described in the scene prompt, and that also include objects whose characteristics match or correspond to the labels included in the label prompt.

As will be described in further detail below, the image synthesis techniques described herein increase the volume and types of images that are used to train AI perception models, improving the accuracy of such AI perception models. For example, realistic training images with various combinations of different types of objects under various conditions (e.g., lighting or weather conditions) can be synthesized in an efficient manner, at scale. The increased amount and types of training images (with appropriate and correct corresponding/matching labels) improves the accuracy and ability of the AI perception models (e.g., to detect objects and make predictions about them in various scenes or conditions).

The labeled image synthesis techniques described herein are improvements over existing techniques for generating images. For example, existing techniques for image generation using generative AI do not come with labels that match the generated image. An unlabeled image (e.g., image that does not have a label of objects in the generated image) is of lesser value for training an AI perception model, such as one for autonomous driving, where the AI perception model to be trained is to learn how to detect the presence of objects (e.g., vehicles, pedestrians, road markings, etc.) under various scenarios (e.g., lighting conditions, weather conditions, etc.). For example, if an image that includes a person wearing a construction uniform is generated, but the image is unlabeled and does not explicitly indicate where that person is in the generated image, then that standalone, unlabeled image, is of limited to no value in training an AI perception model.

Using the generative image synthesis techniques described herein, a synthetic image is generated that matches to labels (e.g., segmentation masks). For example, in the context of training perception models for autonomous vehicles, synthetic images are generated that match to substantial amounts of labeled information that may be across various categories. For example, synthetic images can be generated that match to labels for vehicles, roads, road markings, pedestrians, etc., where the labels that the synthesized image matches to may be a rich set of labels in terms of semantic segmentation, classification, etc. As will be described in further detail below, using embodiments of the techniques described herein, images are synthesized with objects that match to input label prompts (e.g., input segmentation masks) that provide labels for portions of the image being generated. For example, images are generated with elements to correspond to input label prompts.

For example, in the context of autonomous vehicles, using the techniques described herein, not only are labels provided that label the portions of an image that contain cars, but also labels that distinguish between overlapping instances of cars within the image. For example, if the image is generated to have three overlapping vehicles, the image is generated according to a label prompt or rich segmentation mask(s) that encode labels for three different cars.

While embodiments in the environment of autonomous vehicles are described herein for illustrative purposes, the generative image synthesis techniques described herein can be variously adapted to accommodate synthesis of images matching to label prompts for other contexts as well.

Inference Time Generation of Synthetic Images for Training

FIG. 1 illustrates an embodiment of a system for generative image synthesis. In this example, runtime processing is performed, in which the techniques described herein are used to generate synthesized images according to label prompts, as well as scene prompts. Training samples are then generated that include the scene prompts, label prompts, and synthesized images that are generated to match to the label prompts and the scene prompts.

In this example, platform 100 is configured to generate training samples including synthesized images. As one example, platform 100 is implemented as a backend service on an infrastructure such as Google Cloud, Microsoft Azure, Amazon AWS, etc.

In this example, platform 100 includes generative image synthesis engine 106. Generative image synthesis engine 106 is configured to generate synthesized images. As one example, the images to be synthesized are RGB (Red, Green, Blue) images, where the synthesized image includes some number of pixels, and each pixel has RGB channel information.

In the example of FIG. 1, at runtime, two types of prompts are provided as input to generative image synthesis engine 106: scene prompt 102, and label prompt 104. Generative image synthesis engine 106 is configured to synthesize images conditioned on scene prompt 102 and label prompt 104. Images in other spaces may also be generated, as appropriate.

In this example, scene prompt 102 describes a scene or general conditions for the image to be synthesized, such as weather conditions (e.g., driving in the rain, snow, etc.), lighting conditions (e.g., nighttime, daytime, sunset, sunrise, etc.), etc. As one example, scene prompt 102 is a text prompt. Further details regarding scene prompts are described below.

In this example, a second type of prompt is label prompt 104. In some embodiments, the label prompt specifies labels pertaining to objects to be included in the image to be synthesized. For example, the label prompt specifies exact placement of objects that are to appear in the image to be synthesized, with examples of such objects including vehicles, road markings, road surface, pedestrians, etc. As one example, the label prompt is implemented as a segmentation mask (or set of segmentation masks). Another example of a label prompt is 3D bounding boxes for objects to be included in the image to be synthesized. Further details regarding label prompts are described below.

Scene prompt 102 and label prompt 104 are then provided, along with random noise 114, as input to generative image synthesis engine 106. In some embodiments, generative image synthesis engine 106 is implemented as a neural network. In some embodiments, the generative image synthesis framework described herein utilizes diffusion model generators. For example, generative image synthesis engine 106 is implemented as a diffusion-based model. In some embodiments, along with the scene prompt 102 and label prompt 104, noise 114 is also passed as input to generative image synthesis engine 106.

Generative image synthesis engine 106 is then configured to (according to its training) denoise the input noise, conditioned on the scene prompt and label prompt, to generate the corresponding synthesized output image 108. For example, during training of the diffusion model, noise is progressively or successively added to a target image. The diffusion model is trained to predict what noise had been added. By accurately predicting the noise that is added to images at training time, the diffusion model also learns to reconstruct or recover the target training images by reversing the noising process. At inference time, images are generated by taking the randomly sampled noise and passing it through the diffusion model, which denoises the randomly sampled noise that is passed as input to generate a realistic, synthetic image. For example, the diffusion model predicts what noise vector to add to the random input noise to obtain a "real" image. In some embodiments, the sampling procedure includes progressively denoising an image by running the diffusion model multiple times, each time taking the partially denoised image as input and adding the predicted noise.

Two example diffusion models that can be used are pixel diffusion models and latent diffusion models. Further details regarding generative image synthesis using pixel diffusion models and latent diffusion models are described below. For example, based on the type of diffusion model used, different types of pre-processing of inputs may be performed to generate an input suitable to the type of diffusion model. As another example, various types of post-processing may be performed on the output of the diffusion model to generate a training sample. Embodiments of training such diffusion-based models are also described below.

As described above, the generative image synthesis model is configured to take the scene prompt 102 and label prompt 104 as input and, based on the scene prompt and label prompt inputs, synthesize, from the random noise, an output image (synthesized image 108) that matches to the scene described in the text-based scene prompt, and includes objects that match to the label prompt 104.

In some embodiments, as a pre-processing step, the scene prompt is encoded into a vector that is passed as input to the diffusion model. In some embodiments, and as will be described in further detail below, a label encoder is used in a pre-processing step to appropriately encode the label prompt for integration in the diffusion process.

As shown in this example, the diffusion model generator conditions on pairs of scene and label prompts (e.g., pairs of text and segmentation masks) to generate synthetic images. In some embodiments, by conditioning not only on text, but also on label prompts such as segmentation masks, greater control over the image generation or synthesis process is achieved.

In this example, the synthesized image 108, scene prompt 102, and label prompt 104 are combined together (e.g., as a triple) to form a training sample 110. In this example, the training sample is stored to a training data store 112. In this example, the training data store 112 includes training samples for training other models, such as AI (artificial intelligence) perception models.

Integrating Label Prompts into Generative Image Diffusion Models

The following are examples of integrating label prompts into an image diffusion process. The manner in which the label prompts are introduced into the diffusion process can differ based on the type of diffusion model utilized.

As one example, label prompts are incorporated into the generative diffusion process by combining the label prompts with the random noise that is provided as input to the generative diffusion process. For example, in some embodiments, the label prompts and the random noise are implemented or represented using multi-dimensional matrices or arrays.

In some embodiments, the steps performed in the combining are dependent on the dimensions of the label prompt with respect to the random noise. For example, suppose that the random noise is in the RGB space, and is an image of random RGB noise. Suppose the random noise image represents an image of 200×100 pixels. As one example, the random noise image is implemented as a three-dimensional matrix of size/dimensions 200×100×3. The 200×100 dimensions correspond to the 200×100 pixel dimensions. The "3" dimension corresponds to the 3 red, green, and blue components/channels in the RGB space (e.g., 8-bit integer value between 0 and 255), where each pixel is associated with a corresponding set of RGB values.

Now suppose that the label prompt is a segmentation mask that is represented with the following dimensions: 200×100×N. In this example, the 200×100 dimensions correspond to the image dimension of 200×100 pixels. The dimension of length N is a vector that includes the N labels pertaining to a particular pixel.

In this example, the random RGB noise image is 200×100×3. The label prompt is 200×100×N. As one example of integrating the label prompt into the diffusion process, the label prompt is combined with the random noise. In this example, because the label prompt and random RGB noise are aligned or match in the 200×100 dimensions (corresponding to the 200×100 pixel dimensions of interest), the combining includes concatenating or appending the label prompt to the random RGB noise, resulting in a combined matrix with the following dimensions: 200×100×(3+N), where the per-pixel information now has a vector of length 3+N (RGB channel information plus N labels).

The following is but one example of incorporating label prompts into the diffusion process. In other embodiments, incorporating the label prompt into the diffusion process includes encoding or converting the label prompt into an encoded representation so that it can be integrated into the diffusion process. As will be described in further detail below, the type of encoding that is performed can depend on the type of diffusion model being utilized, where the label prompt is to be injected into the diffusion process, etc. Further details and examples of incorporating label prompts into generative image diffusion models are described below.

Training of a Diffusion Model for Generative Image Synthesis

The following are embodiments of training of diffusion models for generative image synthesis. In some embodiments, training the diffusion model includes providing examples of target image-label pairs and text embeddings. For example, the target image includes a collected image (e.g., taken with a camera). The text embedding includes a scene prompt corresponding to the target image. The label includes segmentation masks corresponding to the collected images. As one example, the segmentation masks are generated by neural networks that are configured to produce the correct segmentations of various classes of objects in the target image. Examples of segmentation models include models for road, road paint, free space, vehicles, pedestrians, etc. The generative image diffusion model is then trained based on the target image, the segmentation masks corresponding to the target image produced by the segmentation models, and the corresponding scene prompt. For example, the diffusion model is trained using batches of triples containing images (e.g., of random noise), label prompts, and scene prompts.

As one example, a generative image diffusion model used to implement portions of generative image synthesis engine 106 is trained by taking batches of target images (e.g., based on images collected from camera captures), label prompts, and scene prompts. For example, the target images are noised. As one example, prior to the training step, noise is added to the target image. For example, a diffusion time step is selected (e.g., between 0 and 1000). A mapping is then performed of the diffusion time step to the scale of noise that is added to the target image. For example, a time step is selected. An amount of noise to add is determined based on the selected time step. Noise is then added accordingly.

During the training step, the noised input and the encoded scene prompt are fed to the pixel diffusion model. The label prompt is also provided to the pixel diffusion model. The output of the diffusion model is a predicted noise vector. The predicted noise vector is compared to the actual amount of noise that was added. The difference between the predicted noise vector and the actual amount of noise that was added is computed and a loss is taken (e.g., according to a loss function). In some embodiments, back propagation is performed through the diffusion model to update its parameters.

As described above, in various embodiments, the manner in which label prompts are incorporated into a generative image diffusion process depends on the type of diffusion model being used. In some embodiments, the manner in which a diffusion model is trained is also dependent on the manner in which label prompts are incorporated into the diffusion model process. Further details and examples regarding training of diffusion models are described below.

Embodiments of Handling Conflicts Between Scene Prompts and Label Prompts (Dropout)

In various embodiments of generative image synthesis described herein, both scene and label prompts are provided as input to the generative image synthesis engine, where image synthesis is conditioned on both the scene and label prompts.

In some cases, the scene prompt and label prompt could potentially conflict. As one example, a scene prompt may include in text that there is a pedestrian. However, the label prompt may not include labels for a pedestrian object, in which case there is a mismatch between the label prompt and the scene prompt, where the label prompt and the scene prompt contradict each other with respect to the pedestrian. This can cause issues with the new synthetic images being generated at inference time, such as the synthesized image not matching the labels in the label prompt due to the contradicting text prompt. For example, the model may attempt to resolve any ambiguities by using the scene prompt, but if the scene prompt conflicts with the label prompt, then this may result in the synthesized image having mismatches with the labels. The mismatch between the synthesized image and the label reduces or limits the efficacy of the synthesized image for training (as it does not completely match the label prompt).

The following are embodiments of handling such conflicts between scene and label prompts. As one example way of handling conflicts, the generative diffusion model is trained with dropout on the inputs, where the scene prompt, label prompt, or both may be absent.

As one example, during training, dropout at each of the different prompts is performed. In some embodiments, performing a dropout of a prompt includes replacing the prompt with an empty prompt. For example, if the scene prompt is being dropped out from the training, then it is replaced by an empty text prompt. If the label prompt is being dropped, then it is replaced with an empty label prompt. In some embodiments, the prompt being dropped out is replaced with noise.

By dropping out the scene prompt, contradictions with the label prompt are removed. If the label prompt is dropped, then contradictions with the scene prompt are removed. Performing embodiments of the dropout described herein provides various benefits, including improving the quality of the synthetic image generation, as well as improving the ability to generate consistent synthetic images that match both the scene and label prompts.

In some embodiments, handling such mismatch between scene prompts and label prompts includes biasing the image generation at synthesis time to have the output image match to the label prompt. For example, in some cases, more emphasis is placed on the synthesized image matching to the label prompt (versus the scene prompt). That is, if there is a conflict between the scene prompt and the label prompt, then the diffusion model is biased (via its training) to favor or condition on the label prompt, and ignore any conflicts in the scene prompt. One example way to implement this bias is to, during training, force the diffusion model to learn to pick or favor the label prompt (as compared to the scene prompt). In some embodiments, the biasing of the generative diffusion process towards the label prompt is introduced by performing dropout of the scene prompt so that the diffusion model learns to generate or synthesize images from the label prompt alone. For example, during training, the diffusion model is trained with training samples that include a target image and corresponding scene prompts and label prompts. The diffusion model is trained to recreate the target image from noise based on the scene and label prompts. When performing a dropout, the scene prompt is removed, and the diffusion model is trained (e.g., its weights are updated) to recreate the target image conditioned only on the label prompt (without the scene prompt). In this way, during training, the image synthesis model is updated in a manner in which the model learns to not only condition on both scene and label prompts, but is also trained to synthesize images conditioning only on label prompts.

In some embodiments of performing dropout of the scene prompt, during some training steps, instead of passing the scene prompt, either a generic prompt, or no text, is passed, causing the diffusion model to learn to generate synthetic images from the label prompt alone (separately from the scene prompt).

The following are examples regarding generic prompts. In the context of autonomous vehicles, the target training images are collected from driving scenes, such as a photo of a dashcam when driving. In some embodiments, a generic prompt is a prompt that is applicable to every image. One example of such a generic scene prompt in a driving context is: "a photo of dashcam driving."

In this way, if at inference time the diffusion model receives conflicting scene and label prompts, the model has been biased in its training to synthesize images in a manner that favors generating images that match to the label prompt. For example, the model, via learning using dropout, will be forced to generate images that include objects matching to the label prompt. As one example, suppose that the scene prompt includes text describing driving in the rain. The label prompt includes labels corresponding to a pedestrian (example of an object). During training, it may be the case that the diffusion model did not observe many examples of training samples of rain where there are pedestrians out (as there tend to be fewer pedestrians out when it is raining). Given this, if conditioned only on the scene prompt, then the diffusion model may have a higher likelihood of not including pedestrians (as they appeared less frequently in real-world captures, and the model may learn an association that if there is rain, then there is less likely to be people out). Using the selective prompt dropout techniques described herein, the diffusion model is forced to learn to generate an image that includes pedestrians (to match to the label prompt), even when the rain scene prompt is specified.

Embodiments of Scene Prompts

The following are embodiments of scene prompts for generative image synthesis. As described above, in some embodiments, the scene prompts include text describing the scene for the image to be synthesized. In some embodiments, the text includes key words for the following example scene characteristics:

Area-Type Designation: such as urban, highway, rural, etc.

Weather Conditions: such as rain, fog, snow, etc.

Lighting Conditions: such as glare, sunrise, sunset, etc.

Embodiments of Label Prompts

The following are embodiments of label prompts for generative image synthesis. As described above, in some embodiments, the label prompts include labels regarding objects to be included in the image to be synthesized. The label prompts include the location of objects in the image, as well as further label metadata labels regarding the objects to be included in the image to be synthesized. The image is generated as an output of a diffusion model generator that corresponds to the labels in the label prompt. The label prompt is considered as an accurate label for the generated image.

In some embodiments, the label prompt is a data structure that includes mappings of labels to pixels in the image to be synthesized. One example implementation of a label prompt is a segmentation mask. For example, in the context of an image including an array or matrix of RGB pixels, the label prompt includes a segmentation mask that indicates the particular set of pixels that the object should occupy in the image (example of specification of location of object in the image). In the example of a vehicle object, the segmentation mask includes an indication of the pixels (e.g., at specific indices) that correspond to the outline of the car and its interior.

As one example, suppose that the image to be synthesized is an RGB image with image dimensions of 200 pixels by 100 pixels, where each pixel is associated with RGB channel data corresponding to that pixel. For example, the image to be synthesized is represented by a 200×100×3 dimensional matrix (where the dimension of 3 is, for example, a vector that includes the channel data for the three channels of Red, Green, and Blue).

As one example, the label prompt is a matrix that is a 200×100×N dimensional matrix, where the N-dimensional vector includes the label data corresponding to a particular pixel index (if there is any label data for that pixel). In this way, a given pixel can have multiple label values. In some embodiments, the label data associated with a given pixel is encoded. As one example, the labels are integer values, where each integer value corresponds to a certain class of labels. One example class of labels is vehicle make and model. As one example, vehicle make and model are organized according to a class hierarchy. In some embodiments, each unique combination of make and model is associated with an index into the class hierarchy. As one example, each index is represented using an integer value. For example, a Honda Civic is associated with an integer value, while a Toyota Camry is associated with a different integer value as an index. Suppose a car of a certain make and model is to be included in the image to be synthesized. The car is to take up a certain collection or set of pixels in the image to be synthesized. In this example, the segmentation mask indicates the pixels (e.g., indices in the 200×100 image dimensions) in the image to be synthesized that correspond to a vehicle type object (e.g., have an object-type label that includes a particular value indicating the type of object that is present in a particular pixel). Further, the pixels corresponding to where the vehicle is positioned in the image to be synthesized are also associated with labels including the integer values that indicate the car's make and model.

In some embodiments, there are different masks for different object types. In some embodiments, different masks are utilized for different distinct instances of a given type of object.

Other examples of per-pixel label information included in the label prompt include three-dimensional (3D) object properties, such as object depth, object orientation angle, etc. In some embodiments, values for such 3D object properties are determined based on desired camera parameters (e.g., parameters of the camera that "captured" the synthesized image) and where the object is in the scene. For example, different camera setups may have different parameters such as focal lengths, fields of view, etc. In some embodiments, the synthesized image is generated to simulate having been captured using a camera setup with a particular set of camera parameters.

Embodiments of Generating Label Prompts

The following are embodiments of generating or creating label prompts. As one example, a label prompt, such as a segmentation mask, is programmatically generated. As one example, the segmentation mask is generated via a graphical interface. For example, a drawing tool is used to specify polygons for different types of objects. For example, a user can specify a polygon that corresponds to a car, that another polygon corresponds to a road marking, etc. For example, a user can hand draw labels using a tool that allows them to draw polygons on a blank image. As one example, a user can draw an outline of a car. In the resulting image, the pixels corresponding to the drawn outline of the car are labels for the car. The pixels within the outline are also labelled as belonging to a car. Drawing of the outline of the car provides control and precision in terms of where the car (or any other type of object, as appropriate) is placed.

As described above, another example implementation of a label prompt is a 2D (two dimensional) or 3D (three-dimensional) bounding box. As one example, a user can draw a square via a drawing tool, where the drawn square is then labeled as a 2D bounding box for a vehicle (or any other object that is to fit within the bounding box).

In some embodiments, segmentation masks are generated from existing collected images. For example, the segmentation masks are generated using neural networks. Collected images are passed to segmentation models, which generate labels corresponding to the inputted collected image. The generated segmentation masks may then be passed as label prompts to the generative image diffusion model to generate a synthetic image with objects matching to the labels of the segmentation masks.

In some embodiments, the label prompt is generated using a generative model. For example, a diffusion model is trained to generate segmentation masks from text/numerical prompts. In some embodiments, such a diffusion model is further trained to generate three-dimensional (3D) bounding boxes for objects such as vehicles.

In some embodiments, a batch of masks is pre-computed and then used as prompts for image synthesis.

Further Embodiments of Diffusion Models for Generative Image Synthesis

The following are further embodiments of diffusion models for generative image synthesis. Two examples of diffusion models that are usable to synthesize images conditioned on scene and label prompts are pixel diffusion models and latent diffusion models. Further details regarding training of such models and their use at inference time are described below. The generative image synthesis techniques described herein may be variously adapted to accommodate other types of diffusion models, as appropriate.

As described above, the generative image synthesis techniques described herein condition not only on text-based prompts, but also label prompts (e.g., segmentation masks, 3D bounding boxes, etc.). Below are also described embodiments of integrating of label prompts into generative diffusion models. As will be described in further detail below, in some embodiments, the architectures of the diffusion models are adapted to incorporate the label prompt into the generation process. The type of architecture adaptations will depend on the type of diffusion model being used. In some embodiments, integrating label prompts (e.g., one or more segmentation masks) into the generative diffusion model process includes integrating a label encoder into a diffusion model.

Different types of diffusion models may have different advantages, such as with respect to computational efficiency in training the models, with respect to how realistic the synthesized images will be, etc.

For example, while the quality of the output of a pixel diffusion model may be high, it may also have a relatively high usage of computational resources. As another example, it may be less computationally expensive to train a latent diffusion model as compared to training a pixel diffusion model. For example, one advantage of a latent diffusion model is that fewer computational resources are needed to train the latent diffusion model. However, one trade-off is that there is a two-step training process, in which an encoder/decoder for encoding/decoding to/from the latent space is trained. The image synthesis diffusion model is then trained. How realistic the final output images are will be dependent on, or limited by, the accuracy or efficacy of the encoder/decoder. For example, the quality of the encoder/decoder can impact the quality of details in the images when using a latent diffusion process. For example, the encoder takes an input in the RGB space (e.g., RGB noise image) and converts it into the latent space. The image diffusion model synthesizes an image that is embedded in the latent space. The decoder (of the encoder/decoder pair) then decodes the image embedded in the latent space back to the original RGB space. If the decoder is of lower quality, then the reconstruction process (transformation back to the RGB space from the latent embedding space) can have errors, affecting realism of the output. Similarly, if the encoder is of lower quality, then the decoder may not be able to properly reconstruct details. That is, how realistic the final synthesized images can look can be inhibited by the quality of the encoder/decoder.

Embodiments of Generative Image Synthesis Using Pixel Diffusion Models

The following are embodiments of generative image synthesis using a pixel diffusion model. In embodiments of using a pixel diffusion model for image synthesis as described herein, the diffusion occurs in the pixel space. In the context of RGB images, this includes diffusion in the three-channel RGB space. For example, RGB values are represented as an 8-bit integer (0-255). At inference time, in addition to the scene and label prompts, noise in the RGB space is provided as input.

Figure 2A:
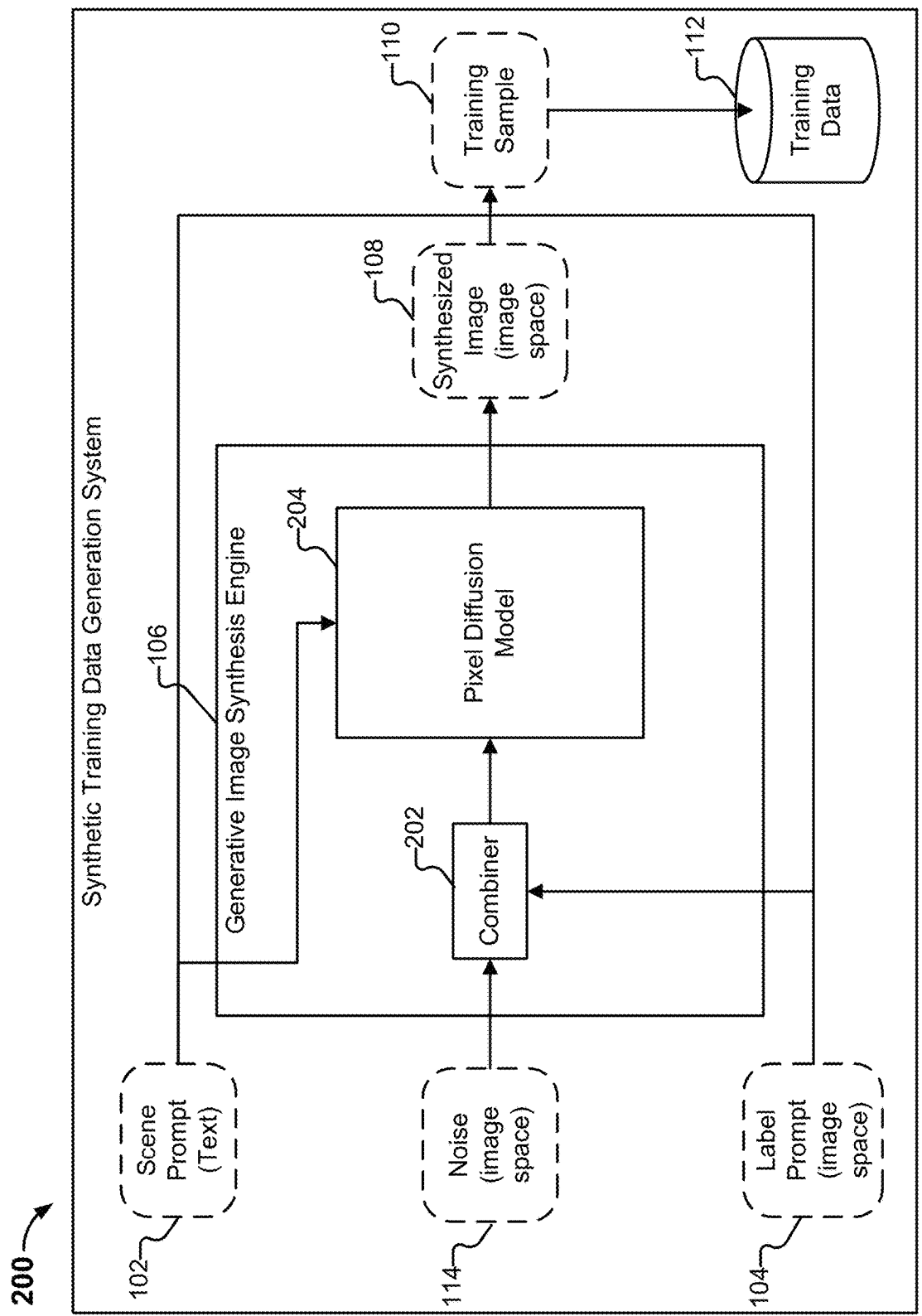
FIG. 2A illustrates an embodiment of a system for generative image synthesis using a pixel diffusion model.

FIG. 2A illustrates an embodiment of a system for generative image synthesis using a pixel diffusion model. In some embodiments, platform 200 is an alternative view of platform 100 of FIG. 1.

In this example, the pixel diffusion model 204 is trained by taking batches of target images (e.g., collected from camera captures), label prompts, and scene prompts. For example, the raw RGB values of the target images are noised. As one example, prior to the training step, noise is added to the target image. For example, a diffusion time step is selected (e.g., between 0 and 1000). A mapping is then performed of the diffusion time step to the scale of noise that is added to the target image. For example, a time step is selected. An amount of noise to add is determined based on the selected time step. Noise is then added accordingly.

During the training step, the noised image and the encoded scene prompt are fed to the pixel diffusion model. The label prompt is also provided to the pixel diffusion model. The output of the diffusion model is a predicted noise vector. The predicted noise vector is compared to the actual amount of noise that was added. The difference between the predicted noise vector and the actual amount of noise that was added is computed and a loss is taken (e.g., according to a loss function). In some embodiments, back propagation is performed through the pixel diffusion model to update its parameters.

The following is an example of inference time processing. In this example, in order for the pixel diffusion model to condition on label prompts, the label prompt is provided as an input. As one example if incorporating the label prompt as an input, the label prompt is combined with the random noise input (which for example, can be considered an image with RGB pixels, but of randomly sampled RGB noise values). For example, combiner 202 is configured to concatenate, append, or add (e.g., vector/component-wise addition) the label prompt to the random noise input. The combined random (image RGB space) noise/label prompt is then fed to the pixel diffusion model 204. As output, the pixel diffusion model 204 generates a synthetic image in the RGB space (image 108). The synthetic image is then combined with the label prompt and scene prompt, as described above, to generate a training sample (110).

Embodiments of Injecting a Label Prompt at an Intermediary Layer

In the above example of FIG. 2A, the label prompt was directly combined with the random input noise (e.g., via concatenation, appending, vector addition, etc.). One source of computation bottlenecks for pixel diffusion models occurs when dealing with high resolution portions. For example, because some convolutional models run computations for every single pixel, which can be computationally intensive for large numbers of pixels, image diffusion models will perform down sampling from higher resolutions to lower resolutions.

Concatenating the label prompts with the random noise at the highest resolution layer (e.g., where both the label prompt and the input random noise image are at their highest resolutions/dimensions/number of pixels) can increase the amount of computational resources that are used in the earlier layers that are processing high resolution portions.

The following are embodiments of efficient incorporation of label prompts into the pixel diffusion process. In some embodiments, rather than incorporating a label at the highest resolution layer, label encoding is performed so that combining (e.g., concatenation) can be performed at a different part or level or layer of the pixel diffusion model, such as at a lower resolution layer that is lower than the highest resolution layer.

Figure 2B:
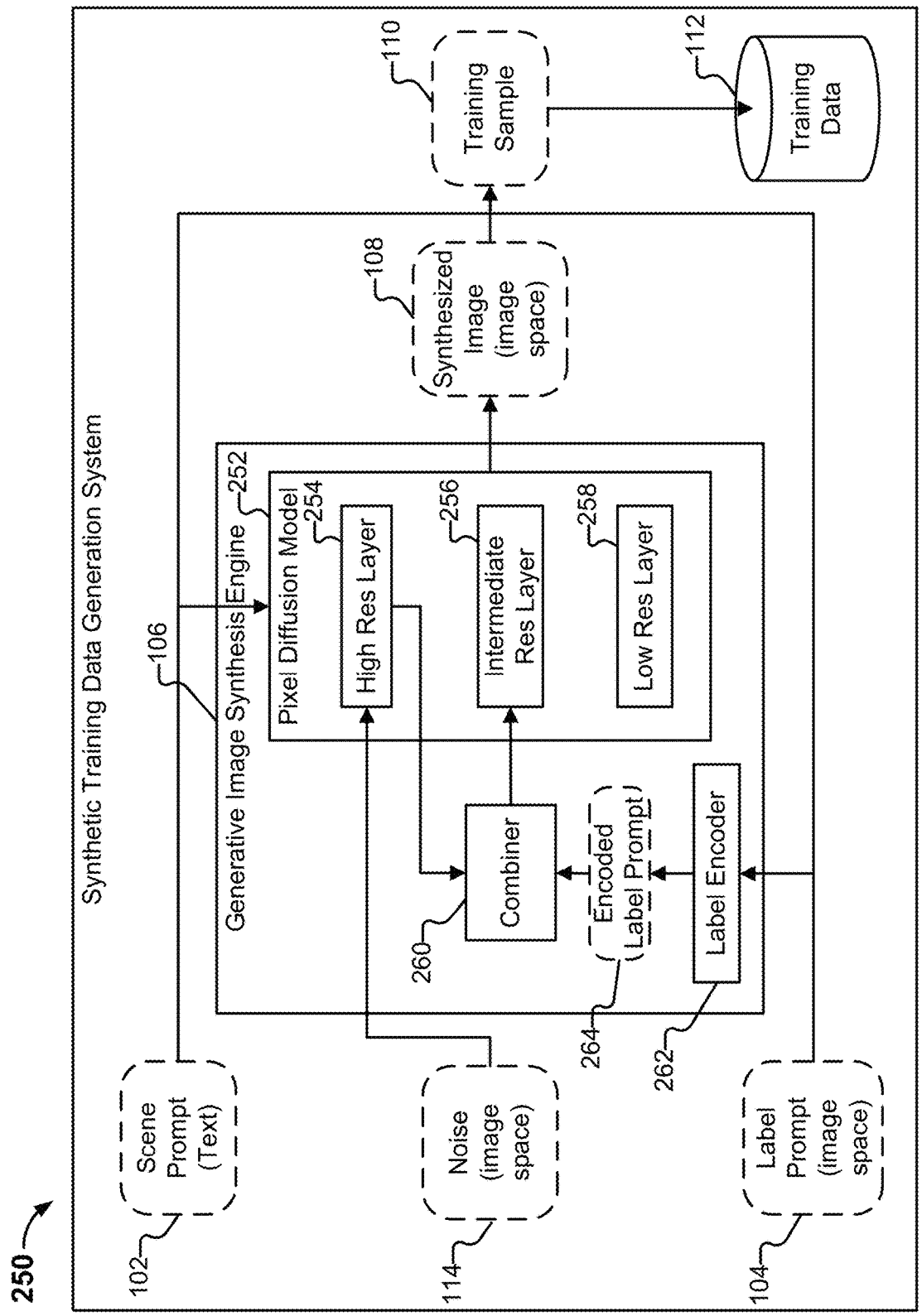
FIG. 2B illustrates an embodiment of a system for generative image synthesis using a pixel diffusion model.

FIG. 2B illustrates an embodiment of a system for generative image synthesis using a pixel diffusion model. In some embodiments, platform 250 is an alternative view of platform 100 of FIG. 1. In this example, inserting of the label prompt at an intermediate stage of the diffusion model process is shown.

In this example, for illustrative purposes, the pixel diffusion model 252 is shown to have three layers (high resolution layer 254, intermediate resolution layer 256, and low resolution layer 258). In various embodiments, the pixel diffusion model may have any other number of layers, as appropriate.

In this example, the random noise 114 (at its original, highest resolution) is passed to the high resolution layer. In the example of FIG. 2B, the output of the high resolution layer is then provided as input to combiner 260. Combiner 260 is configured to combine the output of the high resolution layer with an encoding of the label prompt. That is, the label prompt is introduced at an intermediate stage of the pixel diffusion process, where the label prompt is inserted into the pixel diffusion process by combining the label prompt with an output of a layer of the diffusion process. In some embodiments, in order to combine the label prompt with the output of a layer of the diffusion process, the label prompt is encoded into a format that is combinable with the output of the layer of the diffusion process. For example, label encoder 262 is configured to encode the label prompt into an encoded label prompt 264. In some embodiments, performing the encoding includes down-sampling the label prompt from its original dimensions into a format (e.g., into a lower resolution or dimensional space) that is compatible for combining with the output of the high resolution layer.

For example, the output of the high resolution layer is at a lower resolution than the resolution of the random RGB noise provided as input. As one example, for illustrative purposes, the output of the high resolution layer is at 50×25 (versus 200×100). The label encoder is configured to convert the label prompt (which, in this example, is at 200×100) down to 50×25 so that it can be combined by combiner 260 with the output of the high resolution layer. In this example, the label encoder is configured to encode the label prompt into an encoded label prompt so that the dimensions of the encoded label prompt align with the dimensions of the output high resolution layer so that they can be combined together. As one example, the output of the high resolution layer is added to, appended to, or otherwise combined with the encoded label prompt using combiner 260.

By performing such label encoding and incorporation of the encoded label prompt at an intermediary layer of the multi-layer pixel diffusion model, the computational efficiency of the pixel diffusion process is increased (e.g., by reducing the amount of computation resources utilized in the diffusion process).

Training of a Pixel Diffusion Model for Image Synthesis with Intermediate Injection of Label Prompts The following are embodiments of training a label encoder for encoding a label prompt such that it can be injected into an intermediary layer of a pixel diffusion model. For example, as described above, the label encoder is configured to transform the label prompt from its original dimensions to a lower dimension that matches the dimensions of the output of a higher resolution layer in the pixel diffusion model. The lower-dimensional label prompt is then combined with the output of the higher resolution layer to generate a combined input to a next, lower resolution layer of the pixel diffusion model. In some embodiments, the label encoder is trained to perform such down-sampling (of the label prompt to align to the dimensions of the output of a layer of the pixel diffusion model for combining). As one example, the label encoder is implemented using a convolutional neural network (CNN). In some embodiments, the label encoder is jointly trained with the generative diffusion model. In other embodiments, the label encoder is separately trained.

Embodiments of Generative Image Synthesis Using Latent Diffusion Models Conditioned on Label Prompts The following are embodiments of generative image synthesis using a latent diffusion model.

Figure 3:
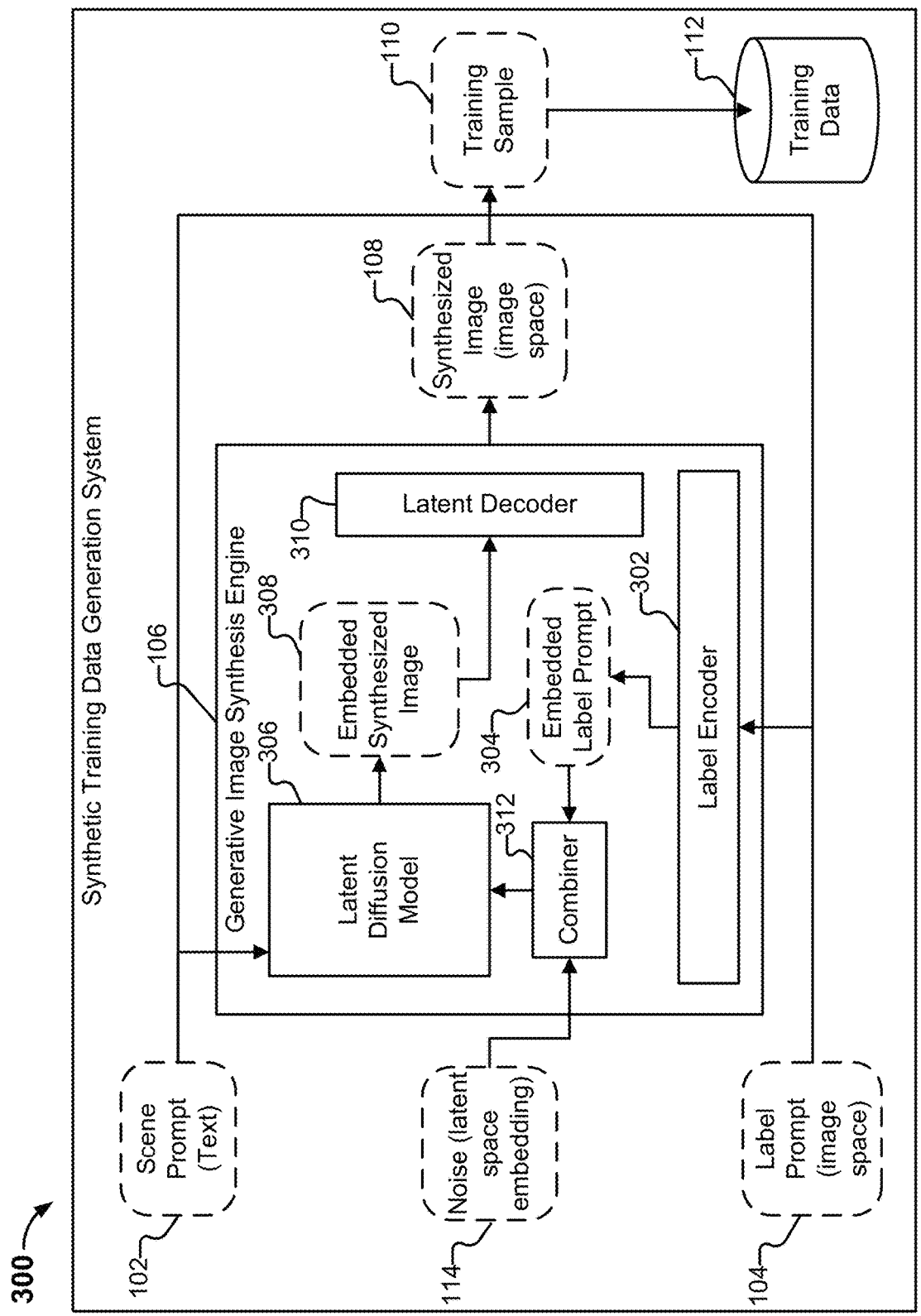
FIG. 3 illustrates an embodiment of a system for generative image synthesis using a latent diffusion model.

FIG. 3 illustrates an embodiment of a system for generative image synthesis using a latent diffusion model. In some embodiments, platform 300 is an alternative view of platform 100 of FIG. 1.

In embodiments of using a latent diffusion model for image synthesis as described herein, the diffusion occurs in a latent space (also referred to herein as a latent embedding space). For example, in the case of a latent diffusion model, the latent diffusion model does not operate in the image space (also referred to herein as the pixel or RGB space), but in a latent embedding space.

In some embodiments, when using a latent diffusion model, pre-processing is performed on the label prompt to convert it into the label embedding space. For example, label encoder 302 is configured to convert the label prompt 104 (which in this example is in the image space) into an embedded label prompt 304 that is in a label embedded space. The embedded label prompt is then provided as input to the latent diffusion model 306. In some embodiments, providing the embedded label prompt to the latent diffusion model includes combining the embedded label prompt with the noise 114 (which in this example is embedded noise that at inference time is drawn from the latent embedding space). For example, combiner 312 is configured to combine the embedded noise with the embedded label prompt (e.g., via concatenating, appending, vector/component-wise addition, etc.).

In some embodiments, the output of the latent diffusion model is an embedded synthesized image 308 that is in the latent embedding space. In some embodiments, post-processing is performed on the output image in the latent embedding space into the RGB space. As one example, the decoder portion (e.g., latent decoder 310) of a pre-trained latent encoder/decoder pair is used to perform such conversion from the latent embedding space to the RGB space. For example, at inference time, the decoder portion of a previously trained latent encoder/decoder is utilized.

As shown in this example, the output of the latent diffusion model is an embedded synthesized image that is in a latent code. The output of the latent diffusion model is passed to the latent decoder, which converts the embedded latent output into the RGB space (e.g., image with RGB values).

The following are further embodiments of pre-processing of inputs for use with a latent diffusion model.

Integrating of Label Prompt for Use with a Latent Diffusion Model

The following are embodiments of integrating label prompts into a latent diffusion model. In some embodiments, integrating label prompts into the latent diffusion model includes adapting the architecture of the latent diffusion model to incorporate the label prompt into the generation process. As described above, in some embodiments, incorporating the label prompt into the latent diffusion process includes encoding the label prompt into an embedded label prompt that is usable as input to the latent diffusion model.

In this example, suppose that in the image space (e.g., RGB space), the image to be synthesized has image dimensions of 200×100 pixels, with a dimension of size 3 to hold the RGB channel data. While the image space is in a matrix of size 200×100×3 (where the dimensions of 200×100 are referred to as the image or pixel dimensions, and the dimension of size 3 is referred to as the channel dimension for the three entries of Red, Green, and Blue for the RGB channel information for each pixel), the latent diffusion model in this example operates in a compressed latent space. For example, in FIG. 3, the random noise 114 that is provided as input to the generative diffusion process is in a smaller compressed space that preserves the aspect ratio. For example, the random noise 114 in the example of FIG. 3 is of dimensions 50×25×3.

Similarly, in some embodiments, the label prompts, which may be initially generated in the image or pixel space, are encoded into a label space embedding for use with the latent diffusion model. In the example of FIG. 3, label encoder 302 is configured to embed the label prompt 104 (which in this example is generated in the image space) into a label space embedding.

The embedded label prompt 304 is then combined with the embedded noise 114 by combiner 312. The combined embedded noise and embedded label prompt is then fed as input to the latent diffusion model. The following are further embodiments regarding combining the embedded noise and the embedded label prompt. In some embodiments, the manner in which the embedded noise and the embedded label prompt is combined is based on the dimensions of the embedded noise and the embedded label prompt. For example, the label space embedding can be of the same dimensions as the latent space embedding (in which the random noise is embedded). In other embodiments, the label space embedding is of different dimensions to the latent space embedding.

In some embodiments, combining of the embedded label prompt (with embedding in a label space) with the embedded noise (in the latent embedding space) includes performing a vector-wise or component-wise addition of the embedded noise and the embedded label prompt. In some embodiments, the combining includes concatenating or appending the embedded random noise and the embedded label prompt together, resulting in a combined latent space/label space embedding.

The following are further embodiments regarding label encoder 302. In some embodiments, the label encoder is configured to ensure that the label encoder maintains positional alignment with the original label segmentation mask(s). For example, the label encoder is configured to avoid shuffling of label positions. In some embodiments, the alignment is between pixels in both the original image and the label prompt. This ensures that the pixels with object labels align with the pixels that correspond to the visual manifestation of the target object (e.g., a vehicle segmentation mask matches the position of the vehicle in the image). As one example, the label encoder is implemented using a neural network architecture, such as a convolutional architecture.

Training of a Latent Diffusion Model for Generative Image Synthesis Conditioned on Label Prompts The following are embodiments of training a latent diffusion model for generative image synthesis using label prompts. As described above, in some embodiments, a latent diffusion model operates on embeddings of inputs in a latent space. In some embodiments, training a latent diffusion model for image synthesis includes incorporating label prompts into the training of the latent diffusion model.

In some embodiments, the diffusion model is trained on batches of triples that include images (e.g., real-world collected images captured using image capture systems such as dash cams), corresponding label prompts, and corresponding scene prompts. In some embodiments, as a pre-processing step prior to training the latent diffusion model, a latent encoder/decoder is used to convert the collected images in those triples into the latent embeddings. For example, the batches of triples of images, label prompts, and scene prompts are converted to batches of triples of latent embeddings, label prompts, and scene prompts. In some embodiments, the latent encoder/decoder is pre-trained (e.g., to convert back and forth between RGB image space and the latent embedding space).

As described above, in some embodiments, a label encoder is used to encode label prompts into a label space embedding for use with the latent diffusion model. In some embodiments, the label encoder is implemented using a machine learning model. In some embodiments, the label encoder model is jointly trained with the image diffusion model.

For example, encoded images (target images of real (or realistic) captured scenes), encoded scene prompts (e.g., encoded from text scene prompt), and labels that have not yet been encoded are received. A training step is then performed where the label encoder is run on the label prompt, resulting in an encoded label prompt. The encoded inputs (encoded target image, encoded scene prompt, and encoded label prompt) are then run through the diffusion model.

In some embodiments, prior to the training step, noise is added to the latent embedding of the target image. For example, a diffusion time step is selected (e.g., between 0 and 1000). A mapping is then performed of the diffusion time step to the scale of noise that is added to the latent embedding. For example, a time step is selected. An amount of noise to add is determined based on the selected time step. Noise is then added accordingly.

During the training step, the noised latent embedding and the encoded scene prompt are fed to the diffusion model. The label prompt is also encoded, where the encoded label prompt is also provided to the latent diffusion model. The output of the diffusion model is a predicted noise vector. The predicted noise vector is compared to the actual amount of noise that was added. The difference between the predicted noise vector and the actual amount of noise that was added is computed and a loss is taken (e.g., according to a loss function). In some embodiments, back propagation is performed through both the latent diffusion model, as well as the label encoder. In this example, both the latent diffusion model, as well as the label encoder, are trained using back propagation of the loss function from the latent image diffusion model.

Figure 4:
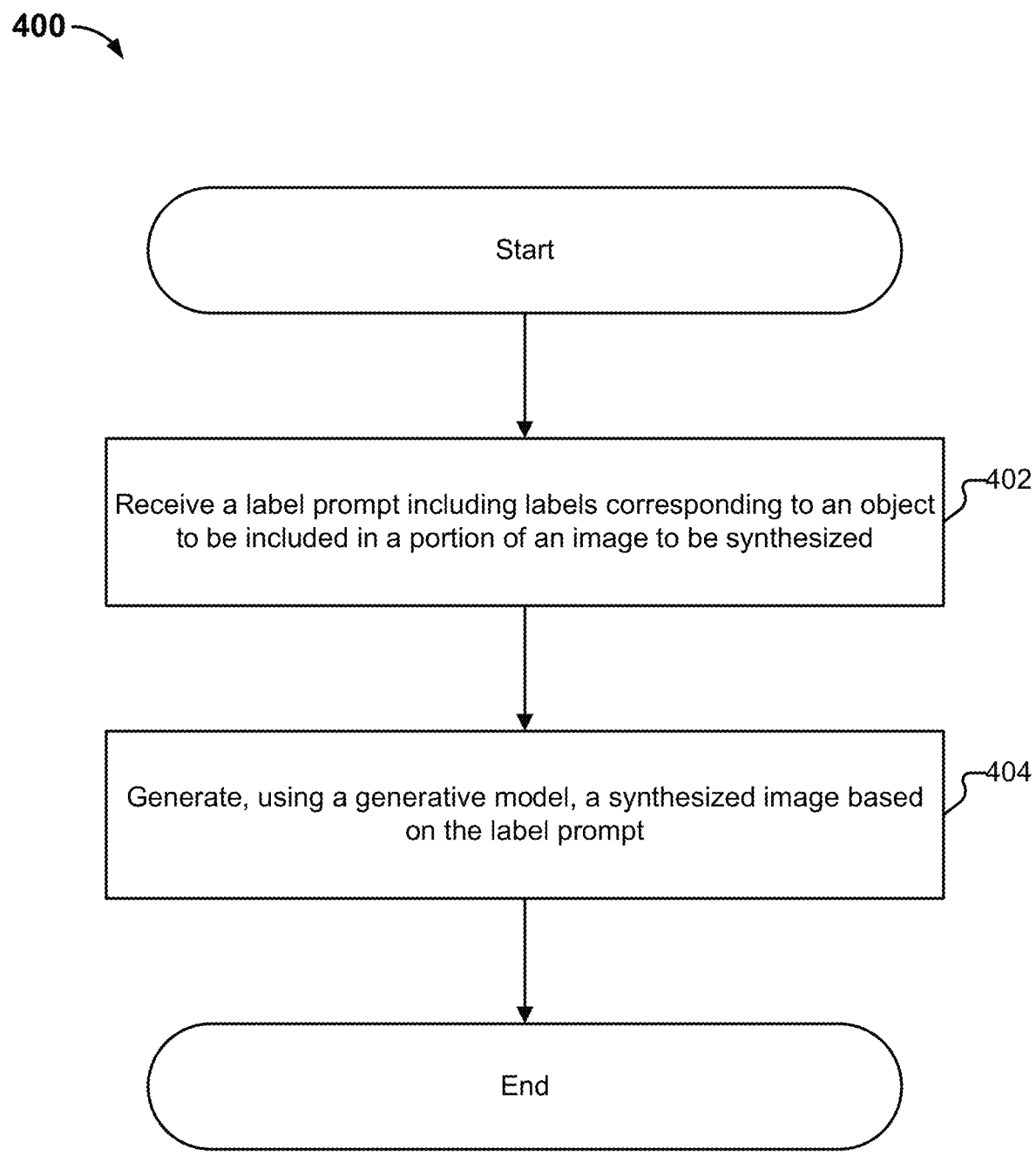
FIG. 4 is a flow diagram illustrating an embodiment of a process for generative image synthesis.

FIG. 4 is a flow diagram illustrating an embodiment of a process for generative image synthesis. In some embodiments, process 400 is executed by platform 100 of FIG. 1. The process begins at 402 when a label prompt is received. In some embodiments, the label prompt includes labels corresponding to portions of an image to be synthesized. For example, the label prompt is a mapping of label metadata to pixels of an image to be synthesized. As one example, the label prompt includes labels pertaining to objects to be included in the image to be synthesized. As one example, the label prompt indicates a location of an object in the image to be synthesized (e.g., for an object, the set of pixel or matrix indices that contain the object). As one example, the label prompt is a set of segmentation masks. As another example, the label prompt is a 3D (three-dimensional) bounding box.

At 404, based on the label prompt, a generative model is used to generate a synthesized image corresponding to the label prompt. For example, suppose the label prompt includes labels for a particular collection of pixels (indicated by pixel indices) indicating that a vehicle-type object is located in that specific collection of pixels. The label prompt is provided to the generative model. The synthesized image (e.g., RGB image) is generated by the generative model to include, at the specified collection of pixel indices, an object corresponding to the labels defined or otherwise mapped to that collection of pixels. In some embodiments, a training sample is generated based on the pair of label prompt and synthesized image that is generated to match to the label prompt.

In some embodiments, the synthesized image is also generated based on a scene prompt. As one example, the scene prompt is a text-based prompt. In some embodiments, the scene prompt includes a description or specification of scene conditions for the image to be synthesized, such as lighting conditions, weather conditions, or other environmental conditions. In some embodiments, the scene prompt is further included in the training sample, along with the pair of label prompt and matching synthesized image.

In some embodiments, the generation of the synthesized image is performed using the generative model as an inference-time process. In some embodiments, the generative model is a diffusion model. Two examples of generative diffusion models include pixel diffusion models and latent diffusion models. In some embodiments, providing the label prompt to the generative model includes combining the label prompt (e.g., appending, concatenating, performing vector or component-wise addition) with random noise that is inputted to the diffusion model, or combining the label prompt with an intermediary output of a layer of the diffusion model. In some embodiments, providing the label prompt to the generative model includes performing label encoding of the label prompt. The encoded label prompt is then used by the generative model to generate the synthesized image.

In various embodiments, different types of label encoding of the label prompt are performed for different types of diffusion model generators. For example, suppose a pixel diffusion model is used. In some embodiments, the label prompt is encoded into a format (e.g., matrix dimensions) aligning or corresponding to the intermediary output of a layer of the diffusion model. The encoded label prompt is then combined with the intermediary output, where the resulting combined structure or entity is provided as input to a next layer of the pixel diffusion model. Such label encoding to combine the label prompt with an intermediary output of a layer in the pixel diffusion model can be performed to reduce computational resources that are used in generative image synthesis at inference time. As another example, suppose a latent diffusion model is used. In some embodiments, the input noise is embedded into a latent embedding space, resulting in embedded noise. In some embodiments, the label prompt is encoded into a label encoding space, resulting in an encoded label prompt. The encoded label prompt is then combined with the embedded noise, where the combined embedded label/noise is then provided to the latent diffusion model.

As described above, in some embodiments, the diffusion model is provided two prompts, a scene prompt and a label prompt. There may be conflicts in what is described in the scene prompt and what is labeled in the label prompt. In some embodiments, handling of any conflicts between the scene prompt and the label prompt is accounted for in the training process. For example, as described above, in some embodiments, drop out of one or both of scene prompts and label prompts is performed during training of the generative image label synthesis model. In some embodiments, as described above, the drop out of one or both types of prompts is performed to train the generative image label synthesis to generate synthetic images that are biased towards generating synthetic images that match to the label prompt (e.g., where the synthetic image is generated to include objects that are located at particular portions of the synthesized image and that have certain properties that match to what is specified in the label prompt).

Embodiments of Generative Simulation Using Generative Image Synthesis Conditioned on Label Prompts As will be described in further detail below, embodiments of the generative image synthesis framework described herein can be utilized in various contexts. As one example, synthetic training data can be generated to create sufficient data for large-scale training, even for rare corner cases (e.g., for which there is little to no collected raw data for some combination of dimensions or factors of interest).

For example, the generative image synthesis framework described herein may be utilized for large scale data balancing, such as generating synthetic images to balance across various combinations of factors or dimensions such as orientations, scales, vehicle types, and scenes/scenarios (e.g., urban/highway, traffic level, weather, illumination/time of day, etc.) via the use of scene and label prompts and generation of synthetic images that match to the scene and label prompts, as described above. This is beneficial especially for rare categories, such as uncommon types of vehicles. For example, suppose that there are few collected images of scooters, where the small number of real-world collected images shows scooters in only a limited number of scenes or contexts (e.g., in daylight, but not in the rain or fog). The generative image synthesis framework described herein can be utilized to generate images containing scooters along other dimensions of variance that were not captured in the original collected images.

Embodiments of the generative image synthesis framework described herein may further be utilized to generate synthetic images to balance across freespace (e.g., across road surface types, times of day, illumination, weather, etc.), pedestrians (e.g., balance across body position, scale, pedestrian type, time of day, crowd level, etc.), as well as intent prediction (e.g., "pedestrian waiting to cross intersection").

The following are examples of generative simulation using embodiments of the generative image synthesis framework described herein.

Transfer Examples

The following are examples of using embodiments of the generative image framework described herein to perform transfer between scene dimensions. For example, suppose an original collected image showing a set of objects (e.g., vehicles) under a particular set or combination of scene characteristics. Suppose a set of segmentation masks is obtained for the set of objects in the original image. The segmentation masks can then be provided as label prompts to embodiments of the generative image diffusion models described herein with a new scene prompt (with, for example, a different set of scene characteristics as compared to the original image) to generate a new synthetic image with objects that match to the segmentation mask labels (e.g., same types or classes of objects identified in the original image, in the same image locations, with the same object characteristics), but in a new scene that is different from the original scene. That is, the generative image synthesis models may be used to facilitate a transfer in the scene between the original image and the synthesized image, but with objects corresponding or matching to the same labels/segmentation masks. The following are examples of such transfers in generative simulation for perception.

Highway to Urban Transfer

Figure 5A:
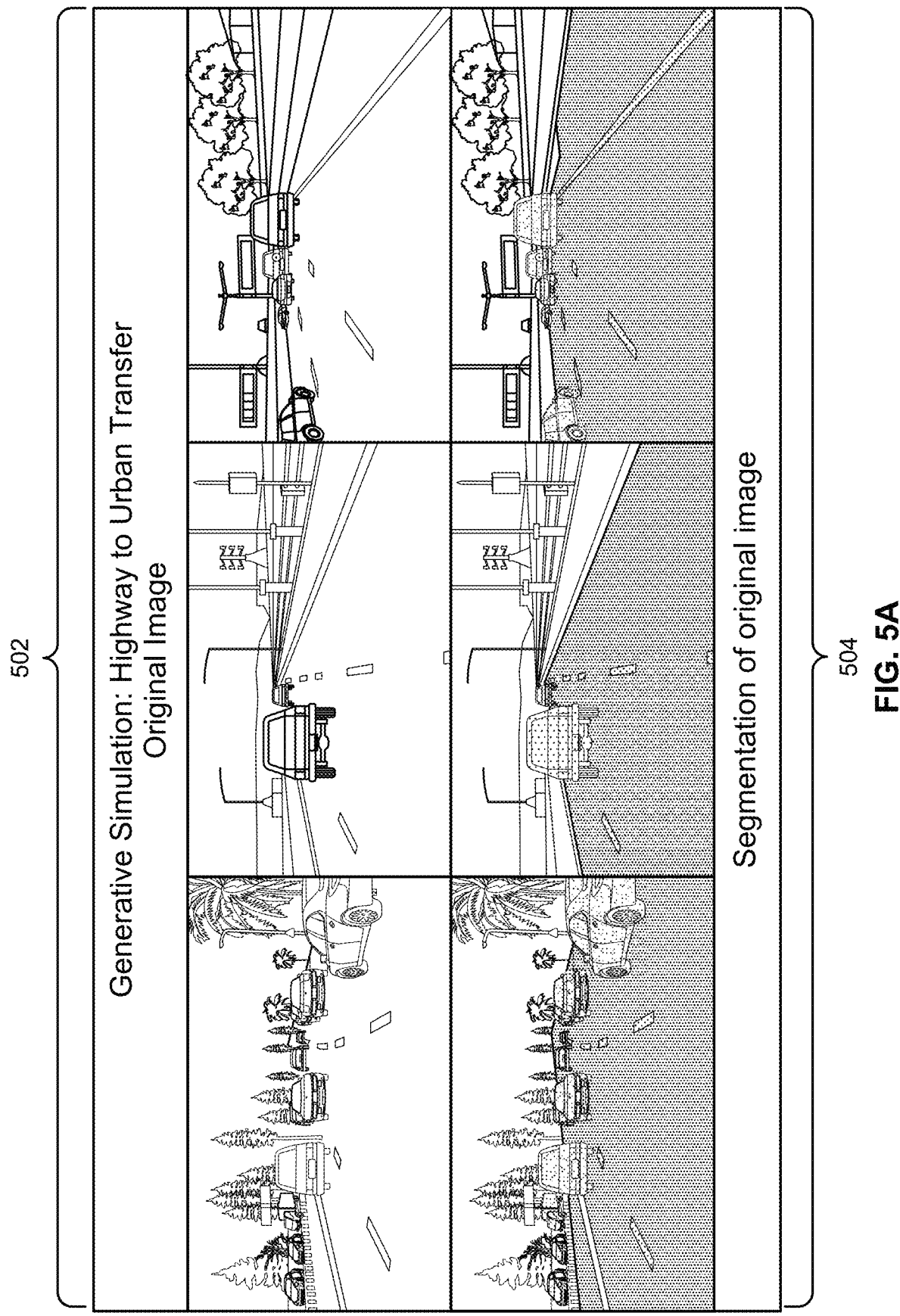
FIGS. 5A and 5B illustrate an example of highway to urban transfer using generative image synthesis.
Figure 5B:
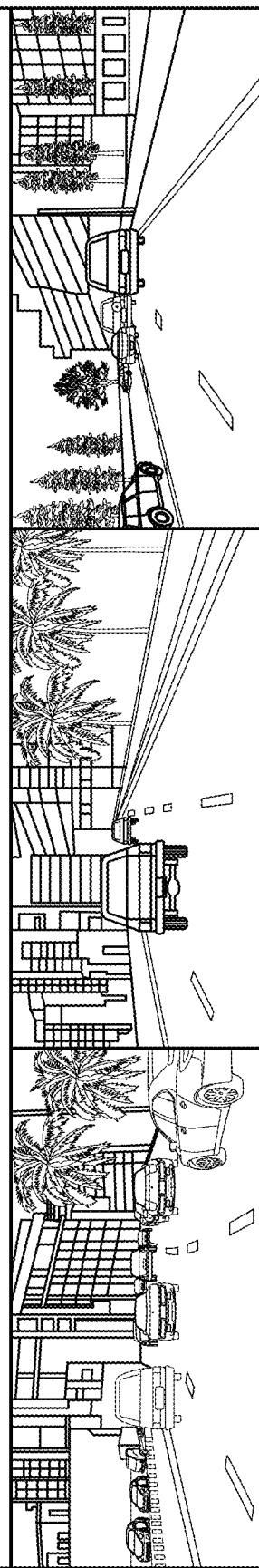
Figure 5B:
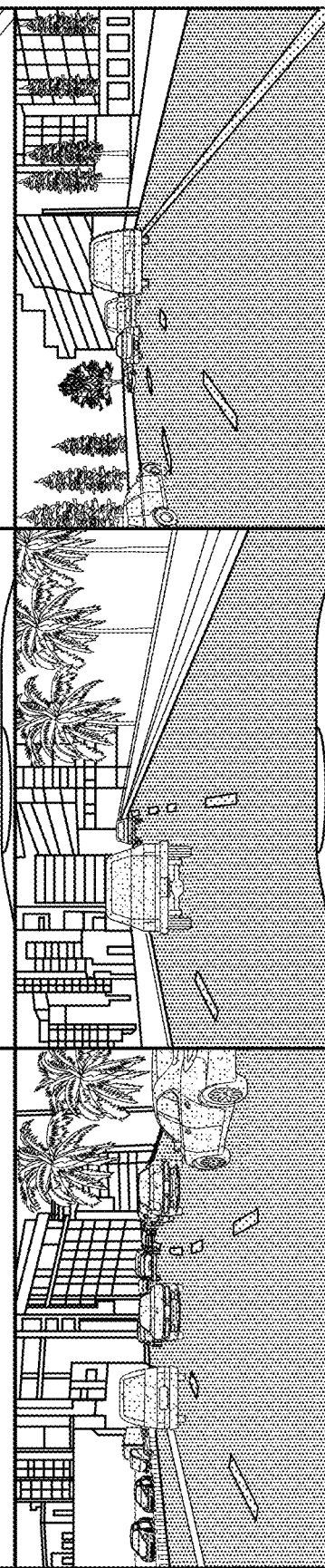

FIGS. 5A and 5B illustrate an example of highway to urban transfer using generative image synthesis. Consider the example of FIG. 5A. In this example, a set of original images is shown at 502 (top row of images shown in FIG. 5A). At 504 (bottom row of images in FIG. 5A) are the original images with their corresponding segmentation masks drawn on top (for example, the shadings of vehicle objects, road, and lane markers correspond to labels of a set of segmentation masks). Continuing with the example of FIG. 5A, now consider the example of FIG. 5B. In this example, the segmentation masks for the original images 502 are used as label prompts to a generative image diffusion model (e.g., generative image synthesis engine 106) along with the scene prompt "A photo of driving on an urban street." Based on conditioning on both the segmentation mask as label prompt, and the scene prompt, synthetic images 552 are generated (top row of images shown in FIG. 5B), now in synthesized urban settings (as compared to the highway settings in the original images of FIG. 5A). As shown in this example, the objects synthesized in the synthetic image are generated to match to the label prompt (and segmentation masks shown at 504). For example, the same segmentation masks overlaid on top of the generated images is shown at 554 (bottom row of images shown in FIG. 5B). Thus, objects (roads, objects, lane markers, etc.), with the same label characteristics (according to the segmentation masks), have been transferred from the original image to new, synthetically generated scenes using the generative image synthesis techniques described above.

Urban to Highway Transfer

Figure 6A:
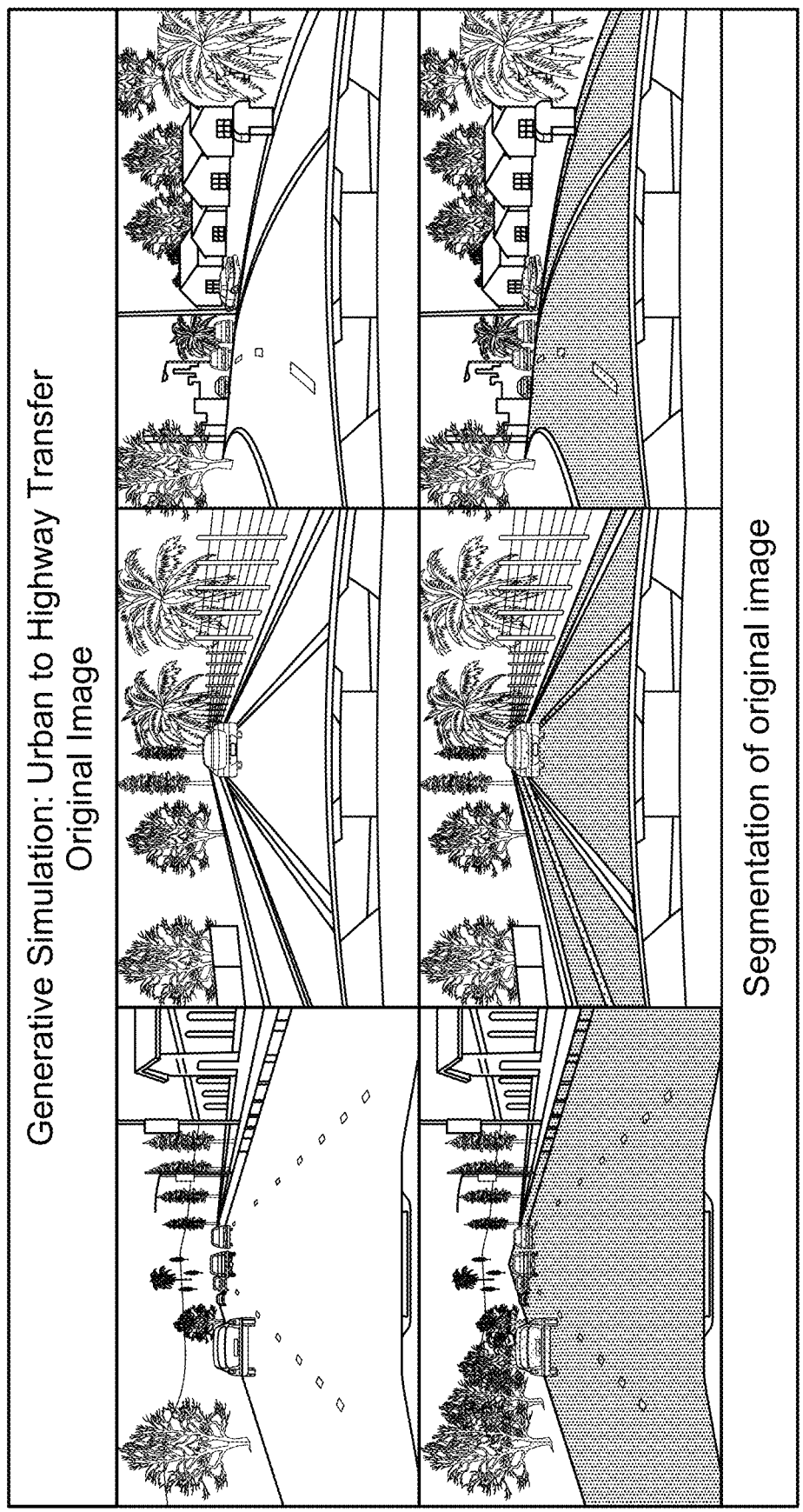
FIGS. 6A and 6B illustrate examples of urban to highway transfer using generative image synthesis.
Figure 6B:
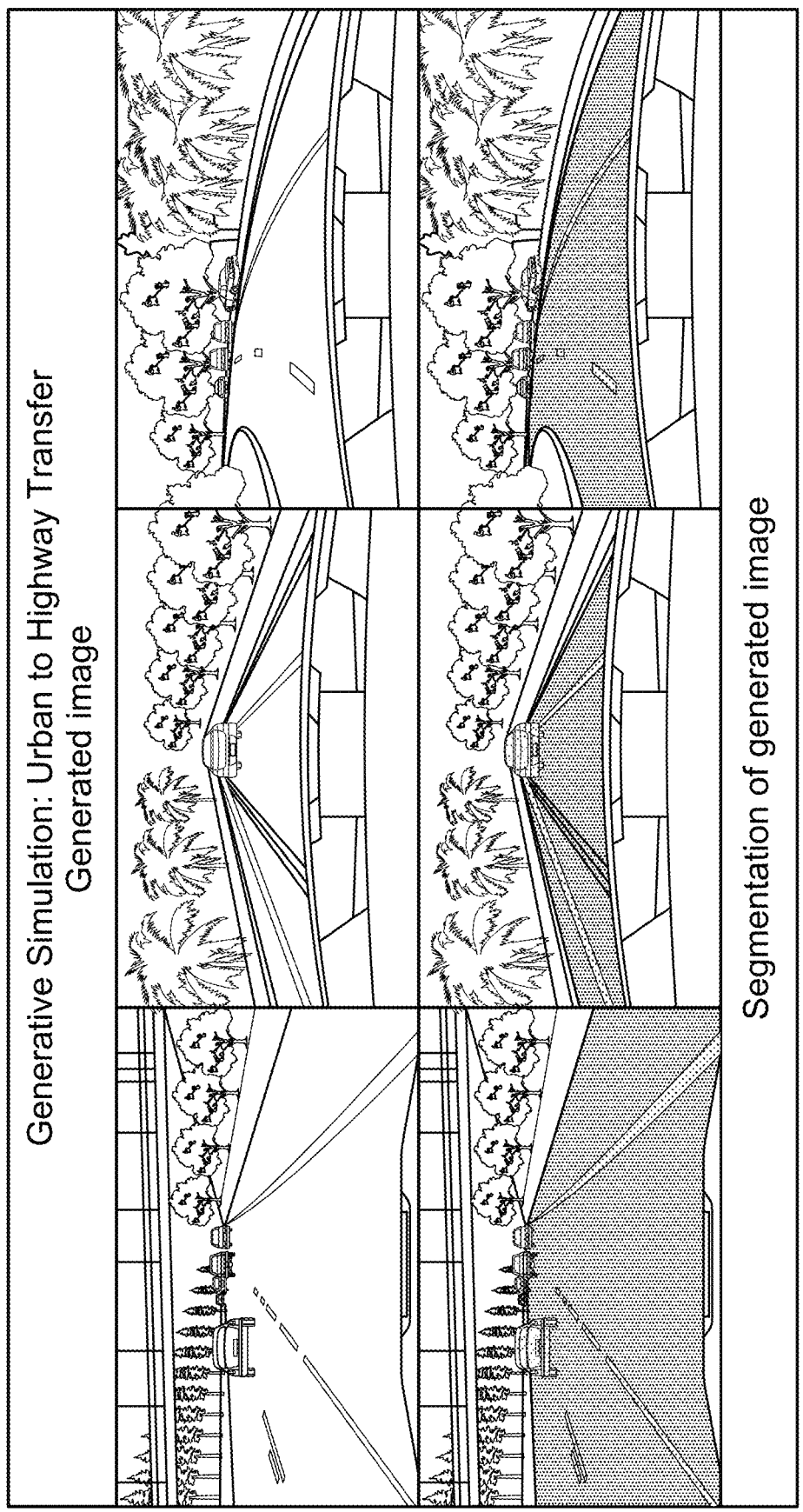

FIGS. 6A and 6B illustrate examples of urban to highway transfer using generative image synthesis. One example scene prompt (that is provided along with the segmentation label masks shown in the bottom row of images of FIG. 6A) used to generate the synthetic images of FIG. 6B is: "A photo of driving on an interstate highway."

Day to Night Transfer

Figure 7A:
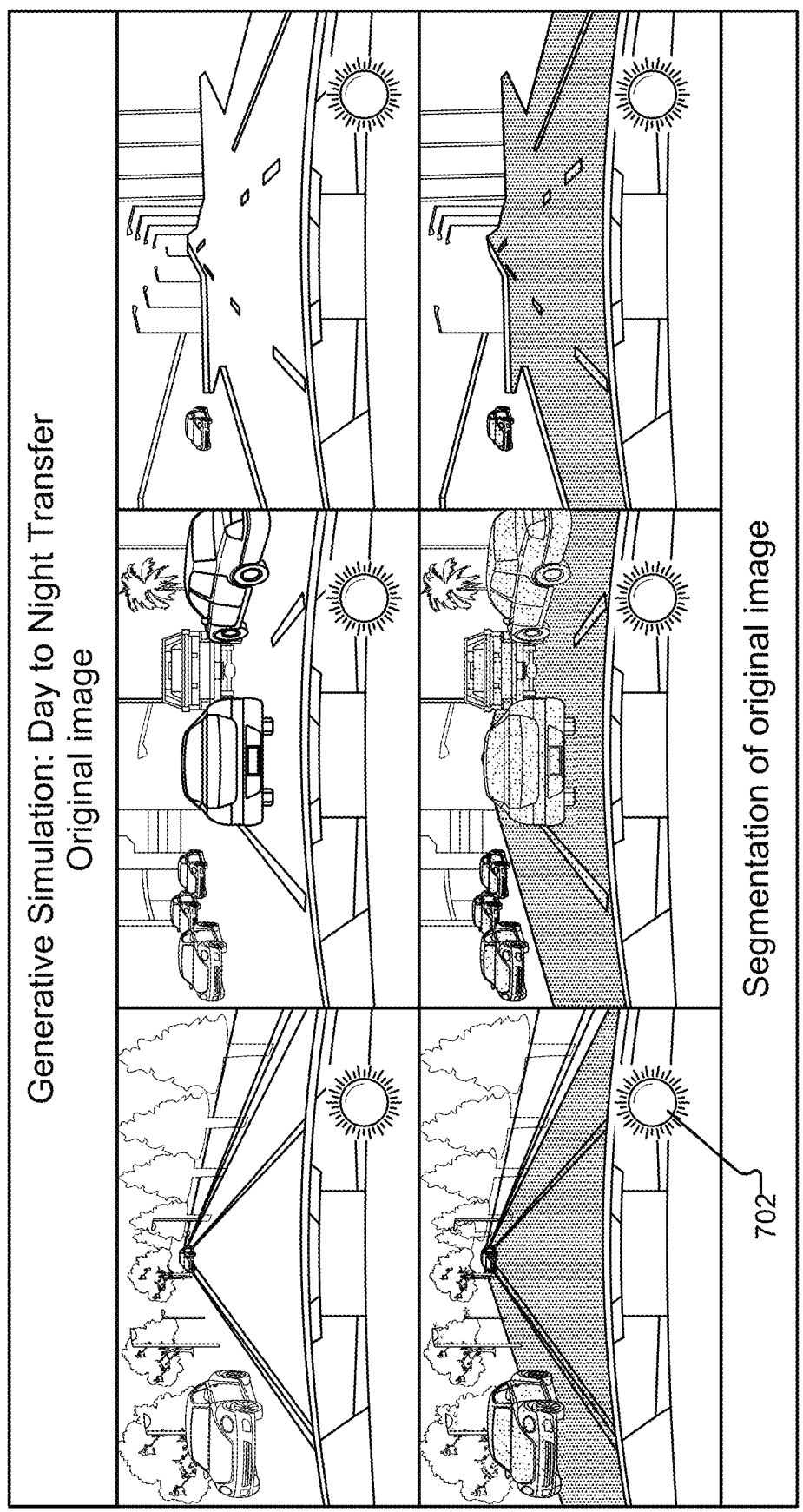
FIGS. 7A and 7B illustrate examples of day to night transfer using generative image synthesis.
Figure 7B:
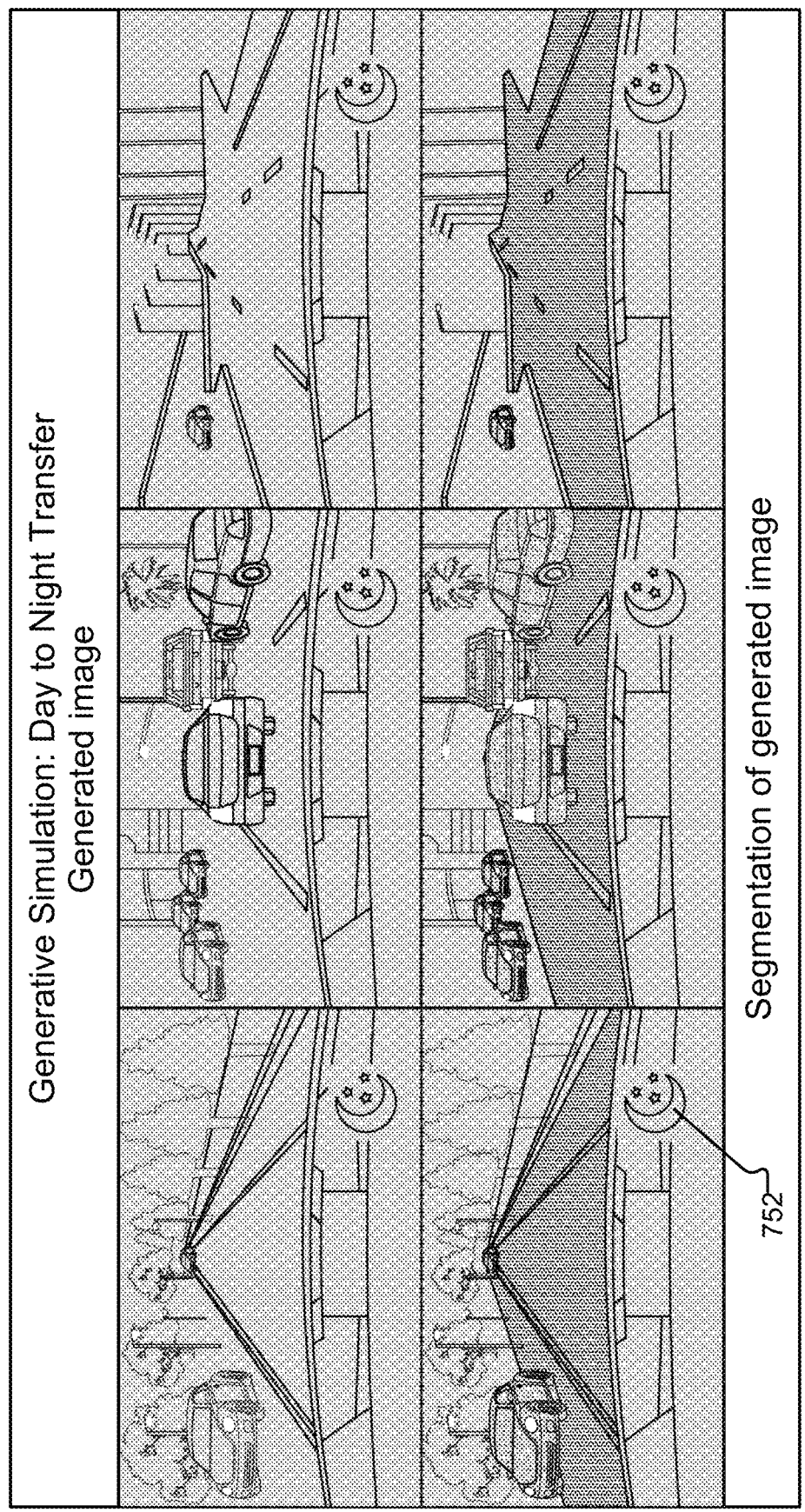

FIGS. 7A and 7B illustrate examples of day to night transfer using generative image synthesis. In the example of FIG. 7A, original images captured during daytime are shown (where the daytime scene is also indicated by sun icon 702). In the example of FIG. 7B, generated images (with objects matching to the segmentation masks of FIG. 7A) in synthesized nighttime conditions/scenes are shown (where the nighttime scene is also indicated by moon and stars icon 752). As shown in the example generated nighttime scenes of FIG. 7B, the headlights and rear lights of cars are on, as are streetlights. One example scene prompt (that is provided along with the segmentation label masks shown in the bottom row of images of FIG. 7A) used to generate the synthetic images of FIG. 7B is: "A photo of driving at night."

In this example, and for the following examples, the synthesized environmental conditions are illustrated in the figures with the addition of crosshatch or other overlays (e.g., to FIGS. 7B, 8B, 9B, and 10B from 7A, 8A, 9A, and 10A, respectively).

Rain Weather Transfer

Figure 8A:
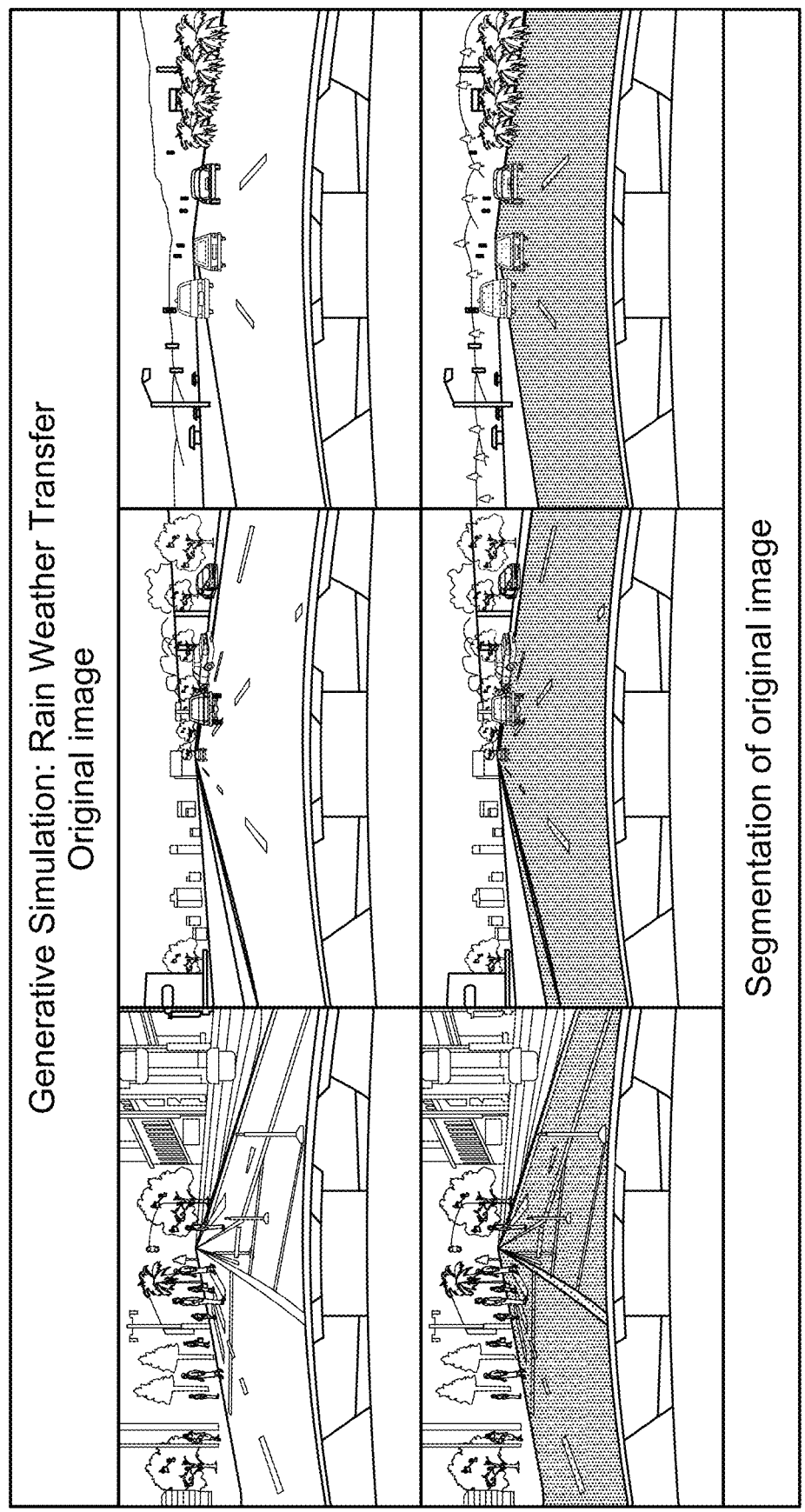
FIGS. 8A and 8B illustrate examples of rain weather transfer using generative image synthesis.
Figure 8B:
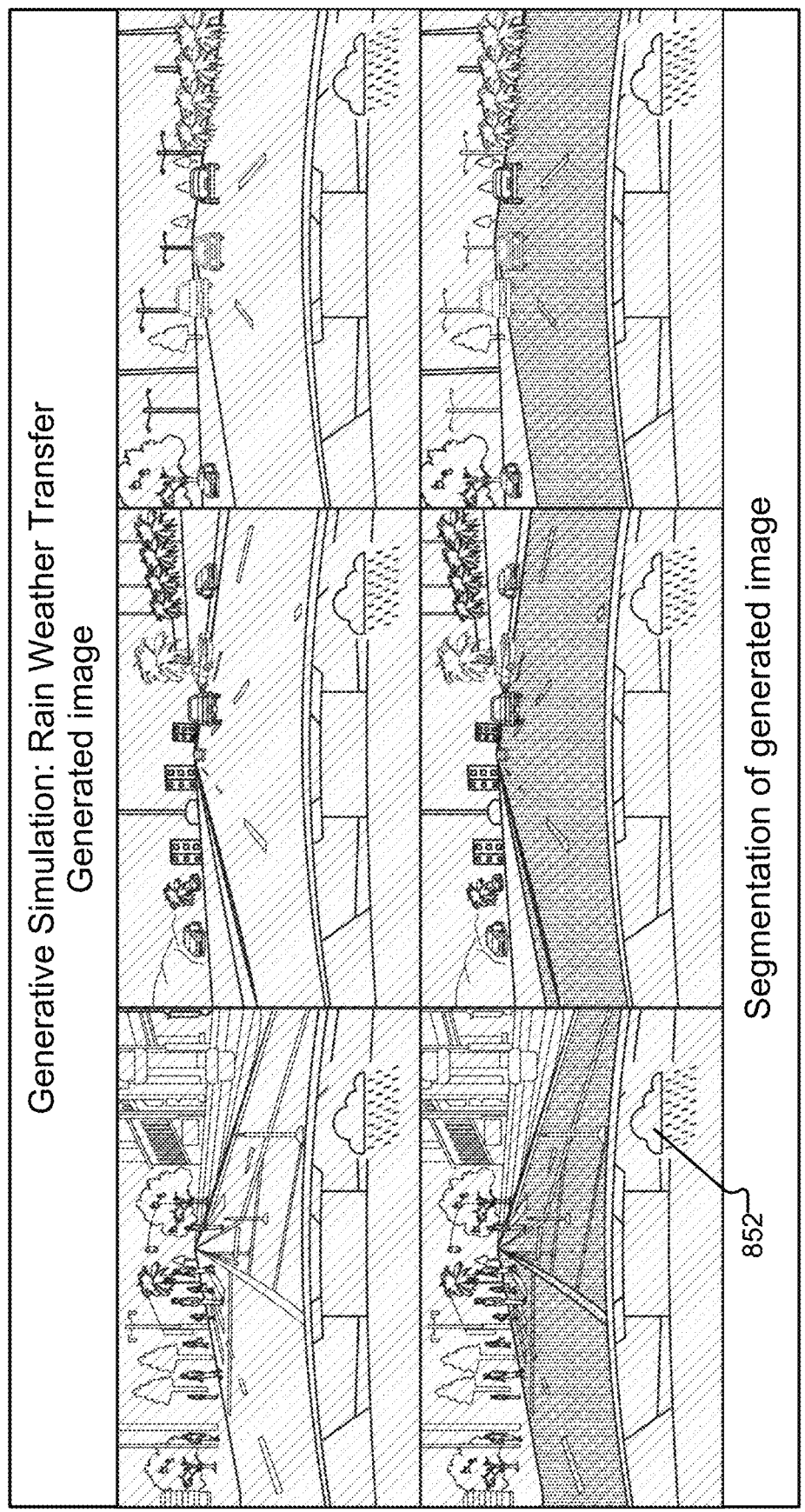

FIGS. 8A and 8B illustrate examples of rain weather transfer using generative image synthesis. In the example of FIG. 8A, original images captured during daytime clear weather conditions are shown. In the example of FIG. 8B, generated images (with objects matching to the segmentation masks of FIG. 8A) under synthesized rainy conditions/scenes are shown (where the presence of rainy environmental weather conditions is also indicated using cloud and rain icon 852). One example scene prompt (that is provided along with the segmentation label masks shown in the bottom row of images of FIG. 8A) used to generate the synthetic images of FIG. 8B is: "A photo of driving in a heavy rainstorm during the day."

Fog Weather Transfer

Figure 9A:
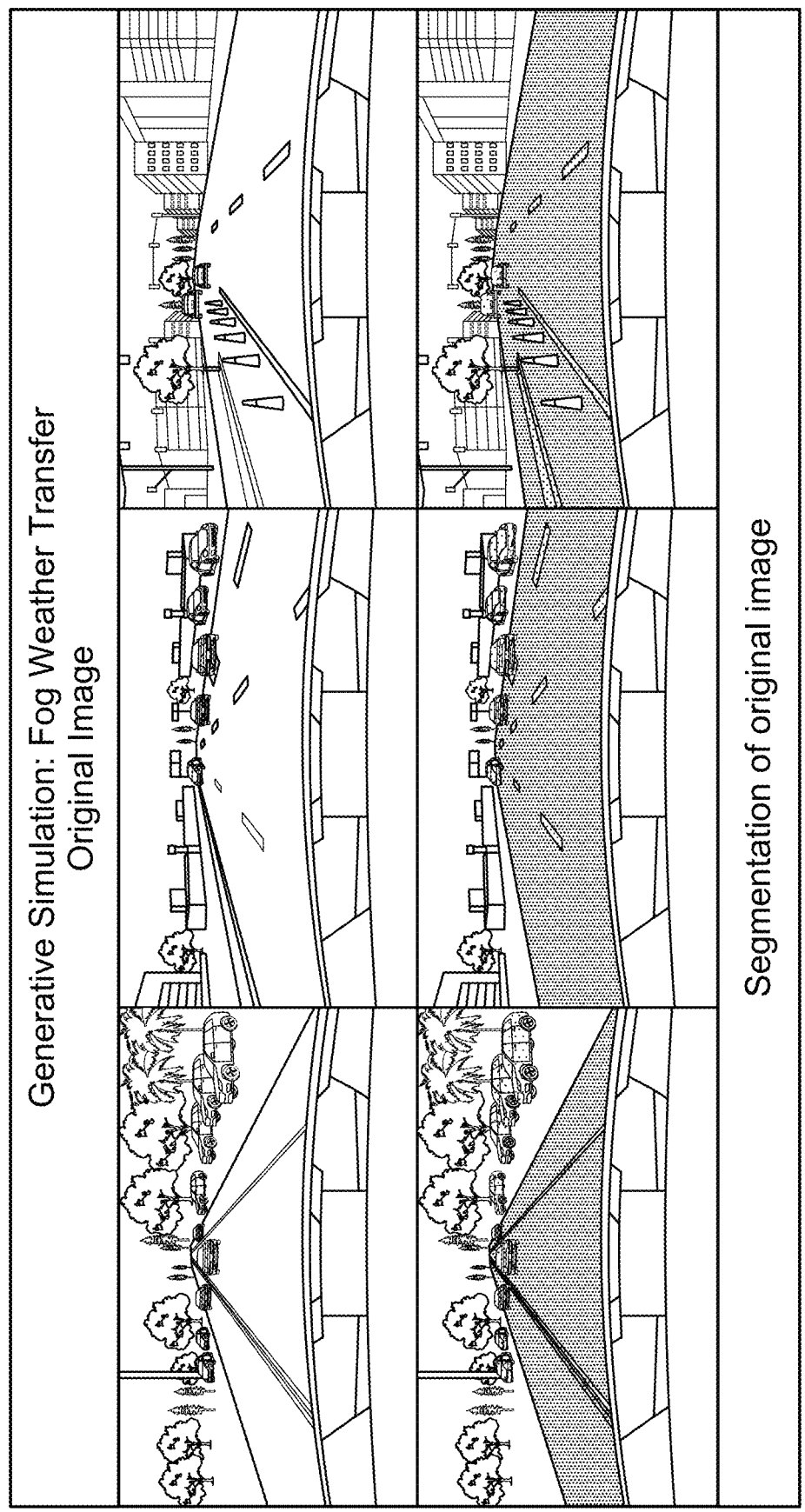
FIGS. 9A and 9B illustrate examples of fog weather transfer using generative image synthesis.
Figure 9B:
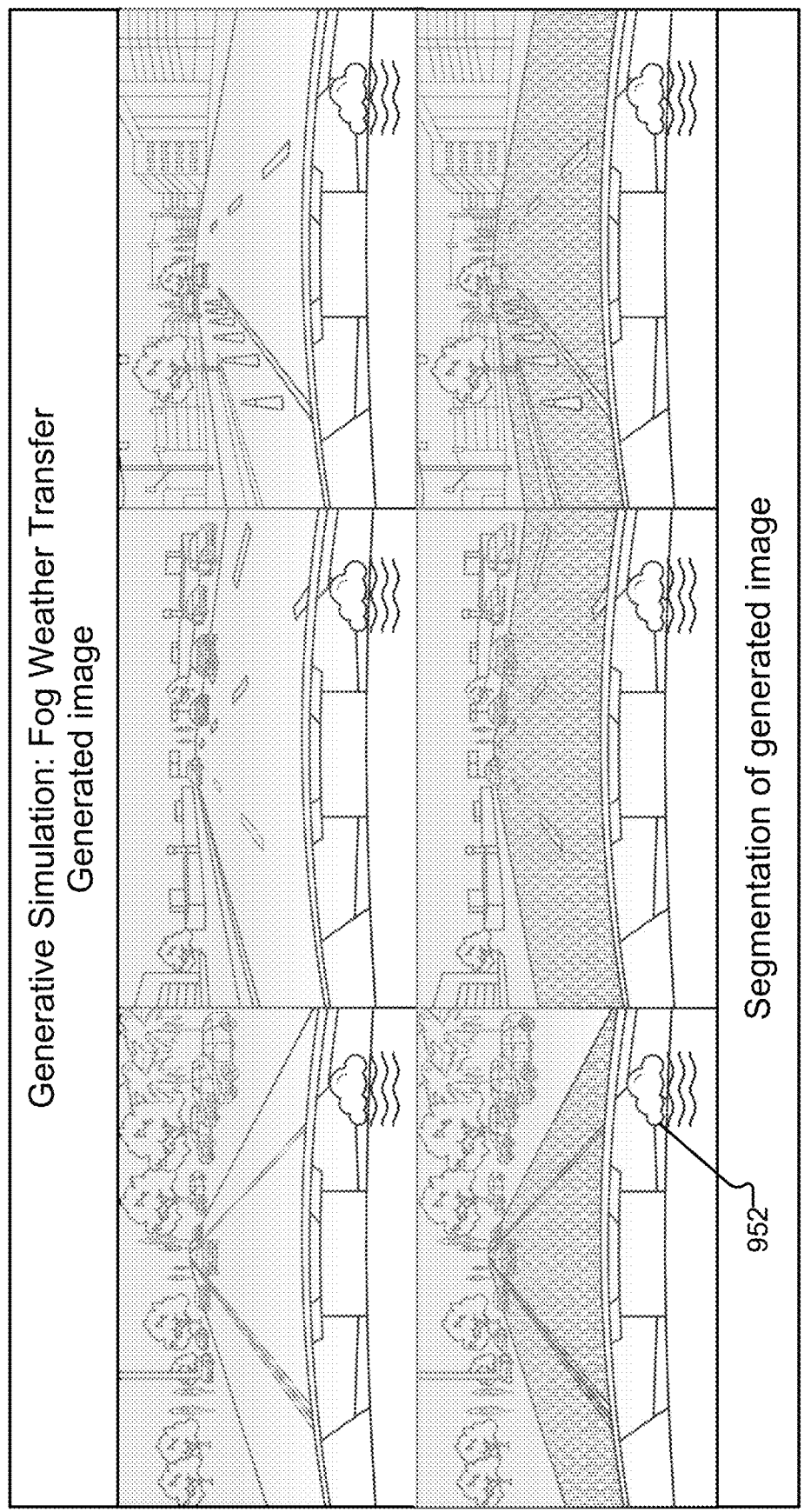

FIGS. 9A and 9B illustrate examples of fog weather transfer using generative image synthesis. In the example of FIG. 9A, original images captured during daytime clear weather conditions are shown. In the example of FIG. 9B, generated images (with objects matching to the segmentation masks of FIG. 9A) under synthesized foggy conditions/scenes are shown (where the presence of foggy environmental weather conditions is also indicated using fog icon 952). One example scene prompt (that is provided along with the segmentation label masks shown in the bottom row of images of FIG. 9A) used to generate the synthetic images of FIG. 9B is: "A photo of driving in very thick fog."

Snow Weather Transfer

Figure 10A:
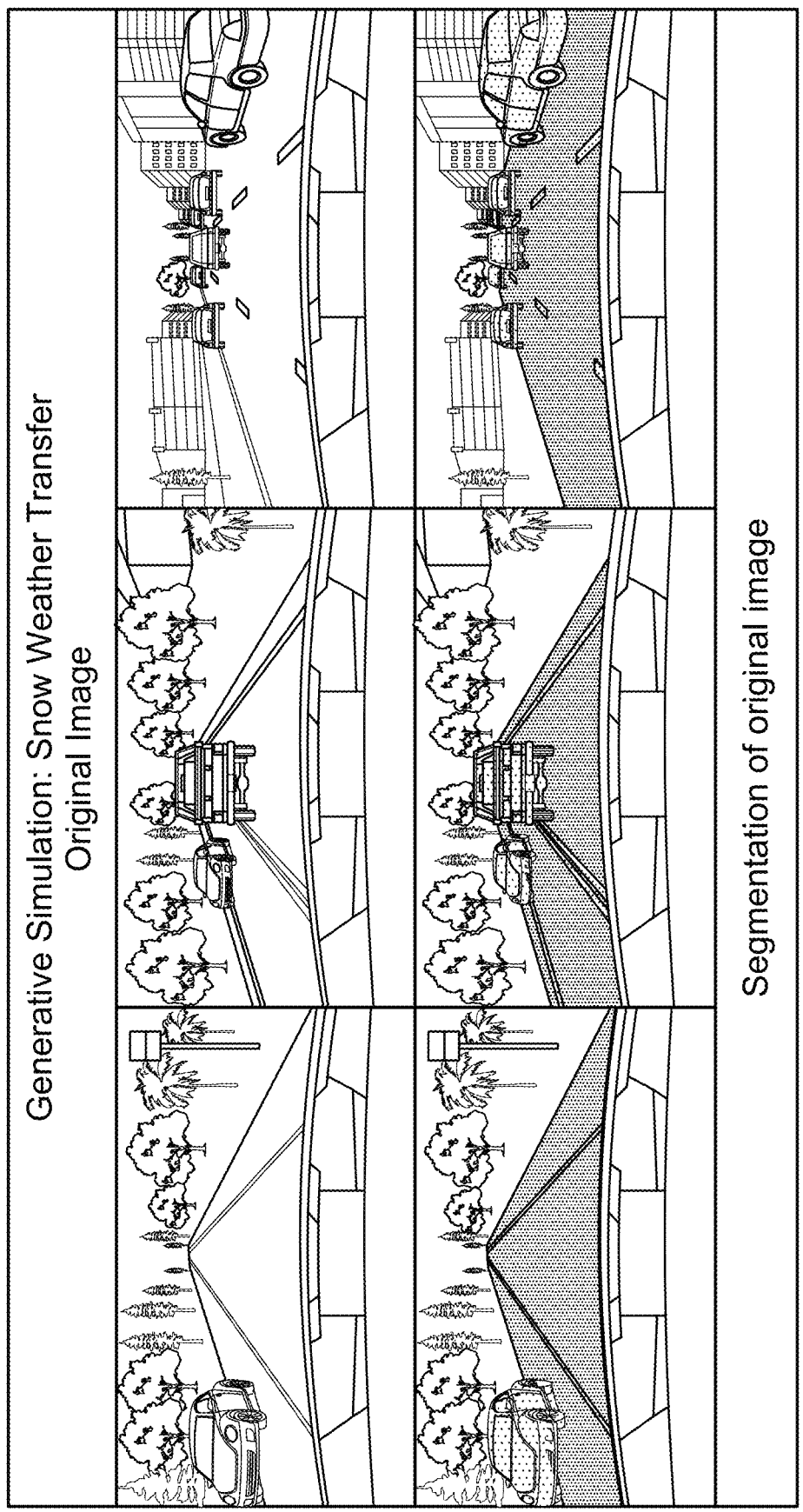
FIGS. 10A and 10B illustrate examples of snow weather transfer using generative image synthesis.
Figure 10B:
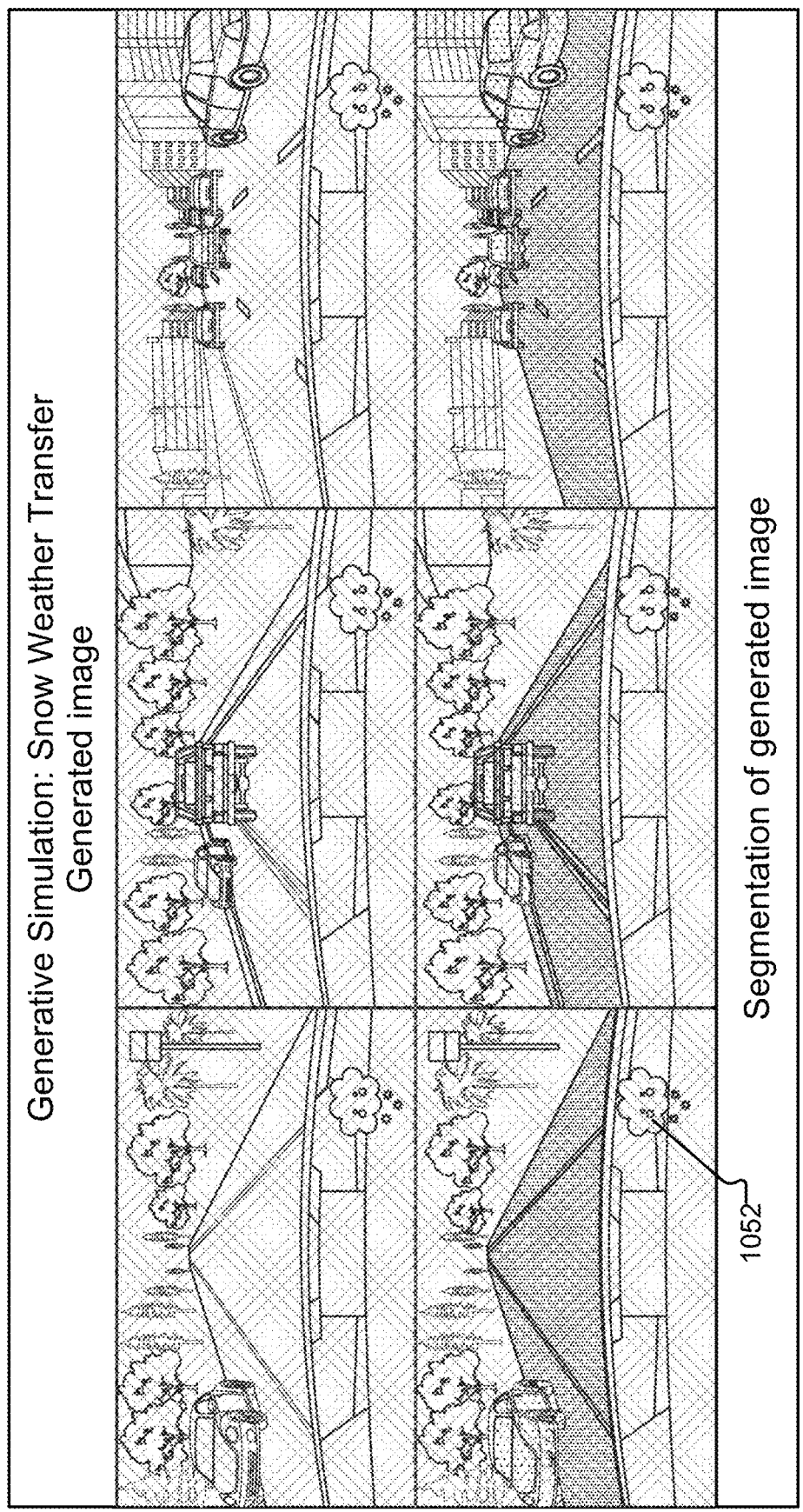

FIGS. 10A and 10B illustrate examples of snow weather transfer using generative image synthesis. In the example of FIG. 10A, original images captured during daytime clear weather conditions are shown. In the example of FIG. 10B, generated images (with objects matching to the segmentation masks of FIG. 10A) under synthesized snowy conditions/scenes are shown (where the presence of snowy environmental weather conditions is also indicated using falling snow icon 1052). One example scene prompt (that is provided along with the segmentation label masks shown in the bottom row of images of FIG. 10A) used to generate the synthetic images of FIG. 10B is: "A photo of driving on snow covered streets."

Vehicle Inpainting

Figure 11A:
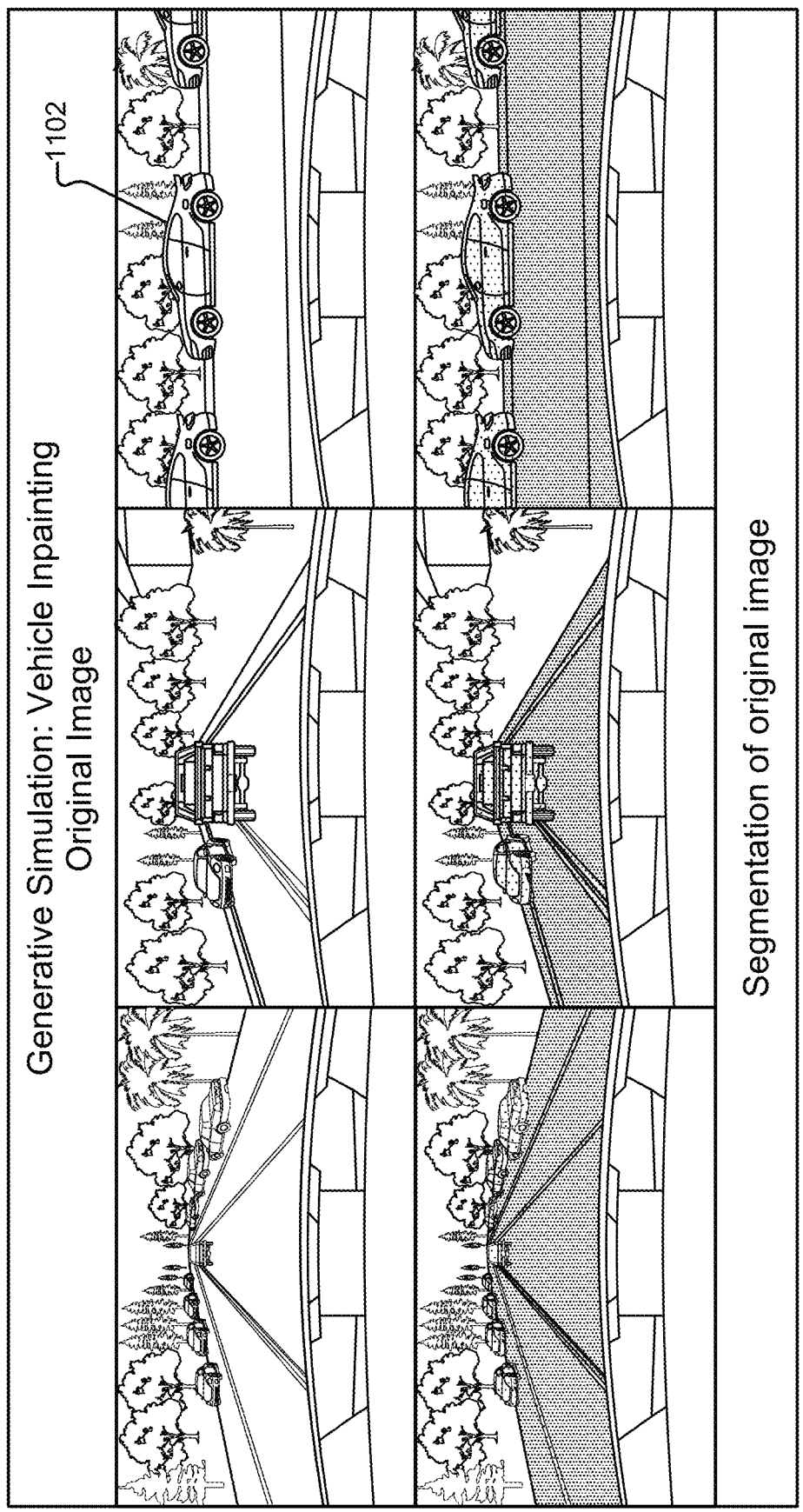
FIGS. 11A and 11B illustrate examples of inpainting using generative image synthesis.
Figure 11B:
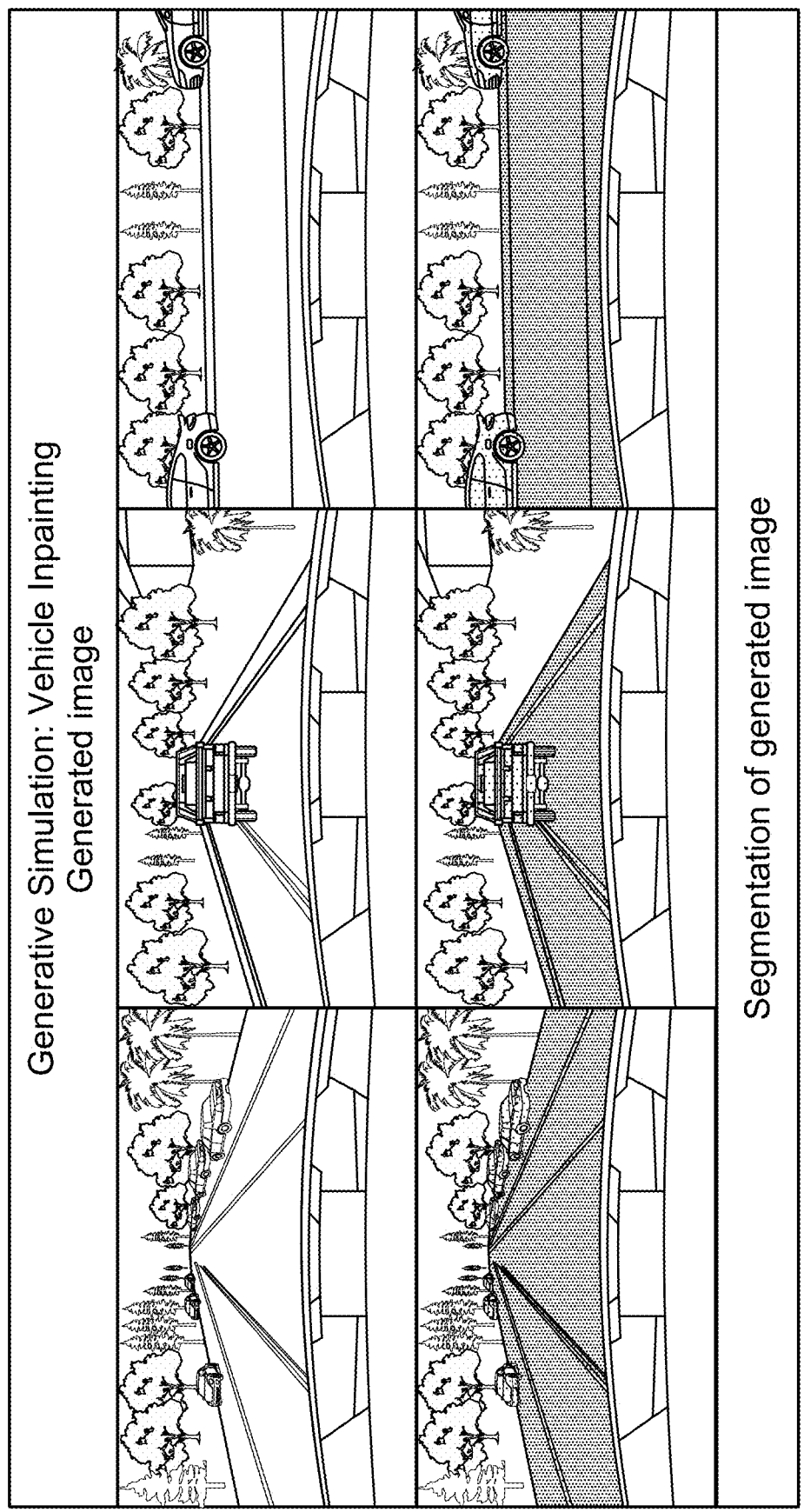

FIGS. 11A and 11B illustrate examples of inpainting using generative image synthesis. For example, the label prompt is derived from the original segmentation mask (e.g., shown in the bottom row of images of FIG. 11A), but with the removal of some objects (e.g., removal of vehicle objects such as vehicle 1102). For example, an object is removed by removing its corresponding labels from the segmentation mask. The modified segmentation mask (without the labels of the object being removed) is then fed as a label prompt to the generative image model. The diffusion model, when generating the images of FIG. 11B, is configured to generate a synthetic version of the original image with the objects removed, and perform realistic inpainting in the areas from which the objects were removed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
one or more processors configured to:
receive a label prompt comprising a mapping of labels to portions of an image to be synthesized, wherein at least some of the labels in the label prompt correspond to an object to be included in the image to be synthesized, and wherein the label prompt comprises a segmentation mask generated using a segmentation model;

receive a text-based scene prompt specifying a scene for the image to be synthesized;

based on the label prompt, scene prompt, and a random noise input, generate, using a generative model, a synthesized image that matches the scene specified in the scene prompt and that includes objects corresponding to the labels in the label prompt; and generate a training sample comprising the synthesized image and the label prompt, wherein a perception model is trained using the training sample; and a memory coupled to the one or more processors and configured to provide the one or more processors with instructions.

2. The system recited in claim 1, wherein the synthesized image comprises an RGB (Red, Green, and Blue) image.

3. The system recited in claim 1, wherein the synthesized image is generated by the generative model based at least in part on combining of the label prompt and the random noise input.

4. The system recited in claim 3, wherein the combining comprises one of concatenating and addition.

5. The system recited in claim 1, wherein the one or more processors are further configured to encode the label prompt into an encoded label prompt.

6. The system recited in claim 5, wherein the synthesized image is generated by the generative model based at least in part on combining of the encoded label prompt with an intermediary output of the generative model.

7. The system recited in claim 5, wherein the synthesized image is generated by the generative model based at least in part on combining of the encoded label prompt with noise embedded in a latent space.

8. The system recited in claim 1, wherein the generative model comprises a diffusion model generator.

9. The system of claim 8, wherein the diffusion model generator comprises one of a pixel diffusion model or a latent diffusion model.

10. A method, comprising:

receiving a label prompt comprising a mapping of labels to portions of an image to be synthesized, wherein at least some of the labels in the label prompt correspond to an object to be included in the image to be synthesized, and wherein the label prompt comprises a segmentation mask generated using a segmentation model;

receiving a text-based scene prompt specifying a scene for the image to be synthesized;

based on the label prompt, scene prompt, and a random noise input, generating, using a generative model, a synthesized image that matches the scene specified in the scene prompt and that includes objects corresponding to the labels in the label prompt; and generating a training sample comprising the synthesized image and the label prompt, wherein a perception model is trained using the training sample.

11. The method of claim 10, wherein the synthesized image comprises an RGB (Red, Green, and Blue) image.

12. The method of claim 10, wherein the synthesized image is generated by the generative model based at least in part on combining of the label prompt and the random noise input.

13. The method of claim 12, wherein the combining comprises one of concatenating and addition.

14. The method of claim 10, further comprising encoding the label prompt into an encoded label prompt.

15. The method of claim 14, wherein the synthesized image is generated by the generative model based at least in part on combining of the encoded label prompt with an intermediary output of the generative model.

16. The method of claim 14, wherein the synthesized image is generated by the generative model based at least in part on combining of the encoded label prompt with noise embedded in a latent space.

17. The method of claim 10, wherein the generative model comprises a diffusion model generator.

18. The method of claim 17, wherein the diffusion model generator comprises one of a pixel diffusion model or a latent diffusion model.

* * * * *